(12) United States Patent
Lee et al.

(10) Patent No.: US 11,703,290 B2
(45) Date of Patent: Jul. 18, 2023

(54) RADIATIVE COOLING DEVICE INCLUDING PAINT COATING LAYER COMPOSED OF NANO OR MICRO PARTICLES

(71) Applicant: ZERC, Seoul (KR)

(72) Inventors: Heon Lee, Seoul (KR); Dongwoo Chae, Seoul (KR); Soomin Son, Seoul (KR); Hangyu Lim, Seoul (KR)

(73) Assignee: ZERC, Seoul (KR)

( * ) Notice: Subject to any disclaimer, the term of this patent is extended or adjusted under 35 U.S.C. 154(b) by 146 days.

(21) Appl. No.: 17/110,489

(22) Filed: Dec. 3, 2020

(65) Prior Publication Data
US 2022/0163271 A1 May 26, 2022

(30) Foreign Application Priority Data
Nov. 24, 2020 (KR) .................. 10-2020-0158664

(51) Int. Cl.
*B32B 7/027* (2019.01)
*F28F 13/18* (2006.01)
(Continued)

(52) U.S. Cl.
CPC ............ *F28F 13/185* (2013.01); *B32B 7/023* (2019.01); *B32B 7/027* (2019.01); *C09D 7/61* (2018.01);
(Continued)

(58) Field of Classification Search
CPC ... B32B 2307/416; B32B 7/023; B32B 7/027; F25B 23/003; F28F 13/185; F28F 2245/06; F28F 2255/20
See application file for complete search history.

(56) References Cited

U.S. PATENT DOCUMENTS 5,256,453 A * 10/1993 Heithorn .................. B05D 7/16
427/407.1
9,927,188 B2  3/2018 Liu et al.
(Continued)

FOREIGN PATENT DOCUMENTS

CN  110567188 A  12/2019
CN  110896639 A  3/2020
(Continued)

OTHER PUBLICATIONS

Koren Office Action dated Jan. 25, 2021 in Counterpart Korean Patent Application No. 10-2020-0158664 (5 pages in Korean).
(Continued)

*Primary Examiner* — Lawrence D Ferguson
(74) *Attorney, Agent, or Firm* — NSIP Law

(57) ABSTRACT

The present invention relates to a technique of cooling a temperature on the surface or under a material by emitting heat under a radiative cooling device to the outside while minimizing the absorption of light in a solar spectrum by forming a paint coating layer with excellent radiative cooling performance on various surfaces. A radiative cooling device according to an embodiment of the present invention may include a paint coating layer formed by coating or dyeing on various surfaces a paint solution mixed with nano or microparticles of which a particle size and a composition are determined in consideration of infrared emissivity and reflectance to incident sunlight in a wavelength range corresponding to a sky window and a binder mechanically connecting the surfaces of the nano or microparticles in a solvent.

20 Claims, 54 Drawing Sheets

(51) Int. Cl.
   *B32B 7/023*   (2019.01)
   *C09D 7/61*   (2018.01)
   *C09D 7/40*   (2018.01)
(52) U.S. Cl.
   CPC .......... *C09D 7/66* (2018.01); *B32B 2307/416* (2013.01); *F28F 2245/06* (2013.01); *F28F 2255/20* (2013.01)

(56) References Cited

U.S. PATENT DOCUMENTS

2004/0121170 A1* 6/2004 Ackerman .............. F01D 5/288
    427/372.2
2018/0244928 A1   8/2018 Van Overmeere et al.

FOREIGN PATENT DOCUMENTS

| CN | 111155332 A | 5/2020 |
| KR | 10-2019-0118766 A | 10/2019 |
| KR | 10-2036071 B1 | 10/2019 |
| KR | 10-2019-0130985 A | 11/2019 |
| TW | 201725234 A | 7/2017 |
| WO | WO 2020/195743 A1 | 10/2020 |

OTHER PUBLICATIONS

Extended European Search Report dated May 12, 2021 in counterpart European Patent Application No. 20211867.5 (10 pages in English).

Chinese Office Action dated Oct. 10, 2022, in counterpart Chinese Patent Application No. 202011403715.3 (10 pages in Chinese).

* cited by examiner

610

700

710

720

1050

1110

1120

1150

1200

1210

1300

1310

1600

1610

1640

RADIATIVE COOLING DEVICE INCLUDING PAINT COATING LAYER COMPOSED OF NANO OR MICRO PARTICLES

CROSS-REFERENCE TO RELATED APPLICATIONS

This application claims the priority of Korean Patent Application No. 10-2020-0158664 filed on Nov. 24, 2020, in the Korean Intellectual Property Office, the disclosure of which is incorporated herein by reference.

BACKGROUND OF THE INVENTION

Field of the Invention

The present invention relates to a radiative cooling device including a paint coating layer composed of nano or microparticles, and more particularly, to a technique of cooling a temperature on the surface of a material or under the material by emitting heat under a radiative cooling device to the outside while minimizing the absorption of light in a solar spectrum by forming a paint coating layer with excellent radiative cooling performance on various surfaces.

Description of the Related Art

A passive radiative cooling device may be passively cooled by reflecting a wavelength (0.3 μm to 2.5 μm) corresponding to sunlight during the day and emitting radiative heat (8 μm to 13 μm) energy that may be removed out of space.

Meanwhile, the passive radiative cooling device may be passively heated by absorbing a wavelength (0.3 μm to 2.5 μm) corresponding to sunlight during the day and not properly absorbing radiative heat (8 μm to 13 μm) energy that may be removed out of space.

The efficiency of the passive cooling device may be confirmed by measuring the optical properties of the device itself.

In order to emit heat, the heat needs to be well emitted into the space due to high absorptivity or emissivity in a long-wavelength infrared area.

According to the Planck distribution, at a temperature of 300K, there is a condition capable of emitting heat at a maximum in a wavelength range of 6 μm to 20 μm. In the case of the Earth, since a sky window area is an area of about 8 μm to 13 μm, the absorptivity or emissivity in the area of 8 to 13 μm needs to be the maximum in order to maximize the heat emission capacity of the passive cooling device.

Infrared emission in the wavelength range of the sky window plays a key role in achieving radiative cooling by actual heat emission. If in the wavelength range, the sunlight (emitted from the sun) incident with the ultraviolet-visible-near-infrared rays may be 100% reflected and the long-wavelength infrared rays in the range of 8 μm to 13 μm, which is the sky window section, may be 100% emitted to the outside, at an ambient temperature of 300K, the cooling performance of 158 W/m$^2$ may be implemented without energy consumption.

If 95% of sunlight is reflected and 90% or more of the mid-infrared rays in the range of 8 μm to 13 μm is emitted to the outside, at an ambient temperature of 300K, the cooling performance of 100 W/m$^2$ may be achieved during the day (that is, there is light absorption by the sun) and the cooling performance of 120 W/m$^2$ may be achieved during the night when there is no light absorption by the sun.

In order to be used as a passive radiative cooling material, the material is not required to absorb incident sunlight due to high transmittance or high reflectance for light in a UV-vis-NIR wavelength range, which is incident sunlight. In addition, the material needs to have high absorptivity (emissivity) for long-wavelength infrared rays in the range of 8 μm to 13 μm, which is the sky window section and to have high durability (stability, corrosion resistance) in outdoor conditions. In addition, the material used needs to be inexpensive and abundantly present, and can be formed in a large area by a cheap and easy process.

Polymer materials generally have high absorptivity (emissivity) for long-wavelength infrared rays, but have a disadvantage of being easily deteriorated by UV rays and moisture when left outdoors due to the nature of the material to shorten the lifespan.

In addition, since thick polymer materials are broadband emitters with high emissivity in all infrared wavelengths, the radiative cooling performance is inferior to selective emitters with high emissivity in the sky window.

In the case of using a multilayered thin film made of an inorganic material or a ceramic material, the number of stacked layers needs to be large in order to increase the emissivity in the entire sky window to increase the solar absorptivity, thereby making it difficult to achieve high-efficiency radiative cooling performance.

In addition, radiative cooling devices including lower metal reflective layers such as silver and aluminum are difficult to apply the radiative cooling in real life due to long-term stability problems (oxidation problems) and unit cost problems of silver and aluminum, and these metal materials mainly perform a regular reflection to cause eye fatigue and light bleeding.

Since existing paint materials contain a high content of binder and use TiO$_2$ nano or microparticles, the materials absorb sunlight in a UV-near-visible light region due to the relatively low bandgap energy of TiO$_2$, and absorb a lot of sunlight in an NIR region due to a high extinction coefficient of the NIR region of the polymer binder.

In addition, since these existing paint materials are not composed of materials having a high extinction coefficient in the sky window, there is a problem that the emissivity in the sky window and the emissivity of each angle are not high.

SUMMARY OF THE INVENTION

An object of the present invention is to provide a radiative cooling device capable of cooling a temperature on the surface of a material or under the material by emitting heat under the radiative cooling device to the outside while minimizing the absorption of light in a solar spectrum by forming a paint coating layer with excellent radiative cooling performance on various surfaces.

Another object of the present invention is to provide a radiative cooling device with excellent radiative cooling performance by forming a paint coating layer which absorb less sunlight and has higher emissivity in a sky window than conventional paints.

Yet another object of the present invention is to provide a rigid or flexible radiative cooling device by forming a paint coating layer on a rigid or flexible plate.

Still another object of the present invention is to perform a radiative cooling function and apply a radiative cooling capacity even to fabric materials such as cloths and the surface of a umbrella through dyeing by forming a paint coating layer having a radiative cooling function on non-planar plate such as the surface of a copper pipe for heat exchange or a vehicle roof.

Still another object of the present invention is to provide a radiative cooling device with hydrophobicity which further includes a polymeric protective layer to prevent the penetration of foreign substances such as moisture and air.

Still another object of the present invention is to provide a radiative cooling device which cools below an ambient temperature without energy consumption even in the day time when the sun is shining or the night time when the sun is not shining.

Still another object of the present invention is to provide a cooling function without energy consumption by being applied to an outer surface of a material requiring cooling, such as construction materials, glass, automotive materials, aviation equipment, energy-saving data centers, electronic devices, solar cells, etc.

Still another object of the present invention is to prevent skin burns by sunlight during the day time by being applied to wearable devices, clothes, shoes, umbrellas, etc.

Still another object of the present invention is to provide a stable radiative cooling function even when being exposed to an external environment for a long time by applying a plate made of a ceramic material with excellent chemical stability and mechanical property.

A radiative cooling device according to an embodiment of the present invention may include a paint coating layer formed by coating or dyeing on various surfaces a paint coating layer formed by coating or dyeing on various surfaces a paint solution mixed with nano or microparticles of which a particle size and a composition are determined in consideration of infrared emissivity and reflectance to incident sunlight in a wavelength range corresponding to a sky window and a binder mechanically connecting the surfaces of the nano or microparticles in a solvent.

The nano or microparticles may include at least one nano or microparticle material of $SiO_2$, $Al_2O_3$, $CaCO_3$, $CaSO_4$, c-BN, $ZrO_2$, $MgHPO_4$, $Ta_2O_5$, AlN, LiF, $MgF_2$, $HfO_2$, and $BaSO_4$ and a mixed material mixed with the at least one nano or microparticle material.

The nano or microparticle may be formed of a core and a shell, wherein a nano or microparticle material forming the core and a nano or microparticle material forming the shell may be made of different materials, and the infrared emissivity and reflectance of the nano or microparticle material forming the core and the infrared emissivity and reflectance of the nano or microparticle material forming the shell may be determined so as to be complemented with each other for infrared emissivity and reflectance to incident sunlight in the wavelength range corresponding to the sky window.

In the paint coating layer, the thickness of the shell may be adjusted to control at least one property of a reflective property, an absorption property, and a transmission property according to a difference in refractive index between the wavelength range corresponding to the sky window and the wavelength range of incident sunlight.

In the paint coating layer, the infrared emissivity and the reflectance may be determined by overlapping infrared emissivity and reflectance of each of the nano or microparticles.

The paint coating layer may be formed by coating or dyeing, on various surfaces, a paint solution in which powers of the nano or microparticle are mixed in any one volumetric ratio of 1:0, 3:1, 1:1, 1:3, and 0:1.

The binder may include at least one binder material of dipentaerythritol hexaacrylate (DPHA), polytetrafluoroethylene (DPHA), poly urethane acrylate (PUA), ethylene tetra fluoro ethylene (ETFE), polyvinylidene fluoride (PVDF), acrylic polymers, polyester polymers, and polyurethane polymers.

In the paint coating layer, the infrared emissivity may be increased based on infrared emissivity in a wavelength range corresponding to the sky window of the at least one binder material.

The paint coating layer may be formed by coating or dyeing, on various surfaces, a paint solution in which the nano or microparticles and the binder are mixed in a volumetric ratio of x:1, wherein the x may have a range of 0.2 to 2.5.

The radiative cooling device may further include a polymeric protective layer for blocking the penetration of foreign substances on the paint coating layer.

The thickness of the paint coating layer may be 30 μm to 600 μm.

As the thickness of the paint coating layer increases, the reflectance may increase and the transmittance may decrease.

The paint coating layer may have infrared emissivity of 0.6 or more when the infrared rays are incident at an incident angle of 40° to 70° with respect to a reference line perpendicular to the infrared rays.

According to the present invention, it is possible to provide a radiative cooling device capable of cooling a temperature on the surface of a material or under the material by emitting heat under the radiative cooling device to the outside while minimizing the absorption of light in a solar spectrum by forming a paint coating layer with excellent radiative cooling performance on various surfaces.

Further, it is possible to provide a radiative cooling device with excellent radiative cooling performance by forming a paint coating layer which absorb less sunlight and has higher emissivity in a sky window than conventional paints.

Further, it is possible to provide a rigid or flexible radiative cooling device by forming a paint coating layer on a rigid or flexible plate.

Further, it is possible to perform a radiative cooling function and apply a radiative cooling capacity even to fabric materials such as cloths and the surface of an umbrella through dyeing by forming a paint coating layer having a radiative cooling function on non-planar plate such as the surface of a copper pipe for heat exchange or a vehicle roof.

Further, it is possible to provide a radiative cooling device with hydrophobicity which further includes a polymeric protective layer to prevent the penetration of foreign substances such as moisture and air.

Further, it is possible to provide a radiative cooling device which cools below an ambient temperature without energy consumption even in the day time when the sun is shining or the night time when the sun is not shining.

Further, it is possible to provide a cooling function without energy consumption by being applied to an outer surface of a material requiring cooling, such as construction materials, glass, automotive materials, aviation equipment, energy-saving data centers, electronic devices, solar cells, etc.

Further, it is possible to prevent skin burns by sunlight during the day time by being applied to wearable devices, clothes, shoes, umbrellas, etc.

Further, it is possible to provide a stable radiative cooling function even when being exposed to an external environment for a long time by applying a plate made of a ceramic material with excellent chemical stability and mechanical property.

DETAILED DESCRIPTION OF THE PREFERRED EMBODIMENT

Figure 1:
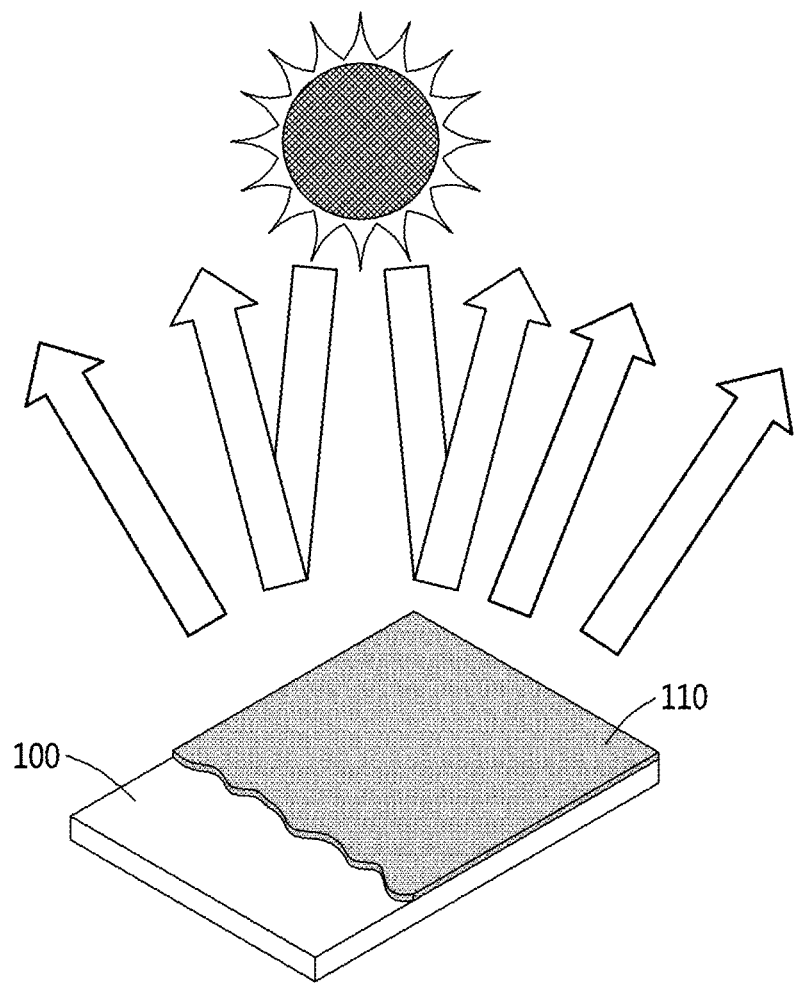
FIG. 1 is a diagram illustrating a radiative cooling device including a paint coating layer composed of nano or microparticles according to an embodiment of the present invention.

Hereinafter, various embodiments of the present disclosure will be described with reference to the accompanying drawings.

The embodiments and terms used therein are not intended to limit the technology described in the present disclosure to a specific embodiment, and it should be understood to include various modifications, equivalents, and/or substitutes for the embodiment.

Hereinafter, in describing various embodiments, the detailed description of related known functions or constitutions will be omitted if it is determined that the functions or constitutions unnecessarily make the gist of the present invention unclear.

In addition, terms to be described below, as terms which are defined in consideration of functions in various embodiments, may vary depending on the intention of a user or an operator or usual practices. Accordingly, the terms need to be defined based on contents throughout this specification.

In connection with the description of the drawings, similar reference numerals may be used for similar components.

A singular form may include a plural form unless otherwise clearly meant in the contexts.

In the present disclosure, expressions such as "A or B" or "at least one of A and/or B" may include all possible combinations of items listed together.

Expressions such as "first," and "second," can modify the corresponding components regardless of their order or importance, and will be used only to distinguish one component from another component, but are not limit the components.

When any (e.g., first) component is referred to as being "(functionally or communicatively) connected" or "accessed" to the other (e.g., second) component, the component may be directly connected to the other component, or may be connected through another component (e.g., a third component).

In this specification, "configured to" may be used interchangeably with, for example, "suitable for," "having the ability to," "changed to", "made to", "capable of", or "designed to" in hardware or software, depending on the situation.

In some situations, the expression "a device configured to" may mean that the device "capable of" together with other devices or parts.

For example, the phrase "a processor configured to perform A, B, and C" may mean a dedicated processor (e.g., an embedded processor) for performing the operation, or a general-purpose processor (e.g., a CPU or application processor) capable of performing the corresponding operations by executing one or more software programs stored in a memory device.

Also, the term 'or' means an inclusive logical sum 'inclusive or' rather than an exclusive logical sum 'exclusive or'.

That is, unless stated otherwise or unless clear from the context, the expression of 'x uses a or b' means any one of natural inclusive permutations.

Terms such as 'part' and 'unit' used herein mean a unit that processes at least one function or operation, which may be implemented by hardware or software or a combination of hardware and software.

FIG. 1 is a diagram illustrating a radiative cooling device including a paint coating layer composed of nano or microparticles according to an embodiment of the present invention.

Referring to FIG. 1, according to an embodiment of the present invention, a radiative cooling device 100 includes a paint coating layer 110.

For example, the radiative cooling device 100 may be a plate coated with the paint coating layer 110. For example, the plate may be referred to as various surfaces.

In other words, the radiative cooling device 100 may have a structure in which the paint coating layer 110 is formed by coating a radiative cooling paint on the plate.

According to an embodiment of the present invention, if the radiative cooling device is implemented to cool below an ambient temperature without energy consumption even during the day time when the sun is shining or at the night time when the sun is not shining, the radiative cooling device 100 may be applied to an outer surface of a material required for cooling such as architecture, automobiles, etc. to perform a cooling function without energy consumption.

For example, the radiative cooling device 100 has basically high bandgap energy of nano or microparticle materials and thus hardly absorbs sunlight in an ultraviolet-near visible region unlike conventional paints using $TiO_2$.

In addition, since the radiative cooling device 100 has each section having partially high emissivity in the sky window, the emissivity in the sky window may be further increased.

In addition, the materials forming the paint coating layer 110 included in the radiative cooling device 100 are basically inexpensive and rich and enable a solution process, so that low-cost and large-area processes are enabled like a polymer-based radiative cooling device.

According to an embodiment of the present invention, the paint coating layer 110 may be formed by coating or dyeing, on various surfaces, a paint solution mixed with nano or microparticles of which a particle size and a composition are determined in consideration of infrared emissivity and reflectance to incident sunlight in a wavelength range corresponding to a sky window and a binder to mechanically connect the surfaces of the nano or microparticles in a solvent.

As an example, the nano or microparticles may include at least one nano or microparticle material of $SiO_2$, $Al_2O_3$, $CaCO_3$, $CaSO_4$, c-BN, $ZrO_2$, $MgHPO_4$, $Ta_2O_5$, AlN, LiF, $MgF_2$, $HfO_2$, and $BaSO_4$ and a mixed material mixed with the at least one nano or microparticle material.

According to an embodiment of the present invention, the paint coating layer 110 may be determined to improve infrared emissivity and reflectance by overlapping infrared emissivity and reflectance of each nano or microparticle. As an example, the paint coating layer 110 may be formed by coating or dyeing, on various surfaces, a paint solution in which powders of the nano or microparticles are mixed in any one volumetric ratio of 1:0, 3:1, 1:1, 1:3, and 0:1.

Here, in the powder of the nano or microparticles, 3 to 4 various types of nano or microparticle materials may be mixed in the paint solution with various volumetric ratios.

For example, when powders of the nano or microparticles of $SiO_2$, $Al_2O_3$, $CaCO_3$, and $CaSO_4$ are mixed in the paint solution, the powders of the nano or microparticles of $SiO_2$, $Al_2O_3$, $CaCO_3$, and $CaSO_4$ may be mixed in various volumetric ratios of 1:1:1:1, 1:2:0:1, and 1:0:3:1.

In addition, a powder of nano or microparticles consisting of a core of $SiO_2$ and a shell of $Al_2O_3$ and a powder of nano or microparticles consisting of a core of $CaCO_3$ and a shell of $CaSO_4$ are mixed in any one volumetric ratio of 1:0, 3:1, 1:1, and 1:3 to prepare a paint solution.

According to an embodiment of the present invention, the binder may include at least one binder material of dipentaerythritol hexaacrylate (DPHA), polytetrafluoroethylene (DPHA), poly urethane acrylate (PUA), ethylene tetra fluoro ethylene (ETFE), polyvinylidene fluoride (PVDF), acrylic polymers, polyester polymers, and polyurethane polymers.

For example, the paint coating layer 110 may increase infrared emissivity based on infrared emissivity in a wavelength range corresponding to a sky window of at least one binder material.

According to an embodiment of the present invention, the paint coating layer 110 may be formed by coating or dyeing, on various surfaces, a paint solution in which the nano or microparticles and the binder are mixed in a volumetric ratio of x:1. Here, x may have a range of 0.2 to 2.5.

For example, the various surfaces may include at least one of a wooden surface, a glass surface, a metal plate surface, an umbrella surface, a house model surface, and a cloth surface.

According to an embodiment of the present invention, the radiative cooling device 100 may be additionally formed with a polymeric protective layer (not illustrated) on the paint coating layer 110 to block penetration of foreign substances.

For example, the thickness of the paint coating layer 110 may be 30 μm to 650 μm, and as the thickness increases, the reflectance may increase and the transmittance may decrease.

According to an embodiment of the present invention, the paint coating layer 110 may be formed by coating or dyeing, on various surfaces, the paint solution through at least one solution process of spin coating, bar coating, spray coating, doctor blading, and blade coating.

For example, the paint solution according to an embodiment of the present invention may be prepared by arbitrarily adjusting sizes (particle sizes) and compositions of various types of nano or microparticles having high bandgap energy and partially high emissivity for long-wavelength infrared rays in a range of 8 μm to 13 μm as a wavelength range of the sky window so as to have high absorptivity (emissivity) in the entire region of the wavelength range of the sky window and mixing a binder material to mechanically connect the surfaces of various types of nano or microparticles and dispersing the mixed binder material in a solvent.

When the binder material is added to the mixed nano or microparticles, the binder material may connect the nano or microparticles to each other to increase the adhesion, thereby increasing durability.

In terms of optical properties, reflection of sunlight may be enhanced due to scattering of an interface between the nano or microparticles having a high refractive index and the polymeric binder material having a low refractive index.

In addition, the polymeric binder material may contribute to having high emissivity of the paint layer by having an extinction coefficient in the sky window.

According to an embodiment of the present invention, the paint coating layer 110 absorbs less sunlight than conventional paints, and has relatively high emissivity within the wavelength range of the sky window to have excellent radiative cooling performance.

In addition, in the radiative cooling device 100, adhesion, surface properties, and external resistance may be changed according to the addition of additional additives. The present invention may provide a radiative cooling device capable of cooling a temperature on the surface of a material or under the material by emitting heat under the radiative cooling device to the outside while minimizing the absorption of light in a solar spectrum by forming a paint coating layer with excellent radiative cooling performance on various surfaces.

Further, the present invention may provide a radiative cooling device with excellent radiative cooling performance by forming a paint coating layer which absorb less sunlight and has higher emissivity in a sky window than conventional paints.

Further, the present invention may provide a rigid or flexible radiative cooling device by forming a paint coating layer on a rigid or flexible plate.

Further, the present invention may perform a radiative cooling function and apply a radiative cooling capacity even to fabric materials such as cloths and the surface of an umbrella through dyeing by forming a paint coating layer having a radiative cooling function on non-planar plate such as the surface of a copper pipe for heat exchange or a vehicle roof.

Further, the present invention may provide a radiative cooling device with hydrophobicity which further include a polymeric protective layer to prevent the penetration of foreign substances such as moisture and air.

Figure 2A:
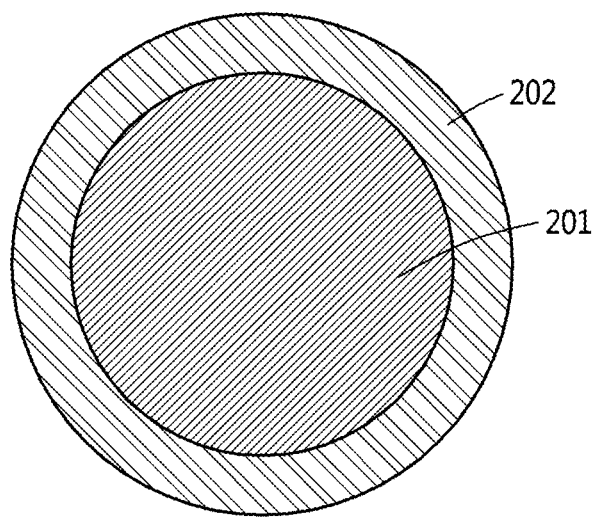
FIGS. 2A and 2B are diagrams illustrating a core and shell structure of the nano or microparticle forming the paint coating layer according to an embodiment of the present invention.
Figure 2B:
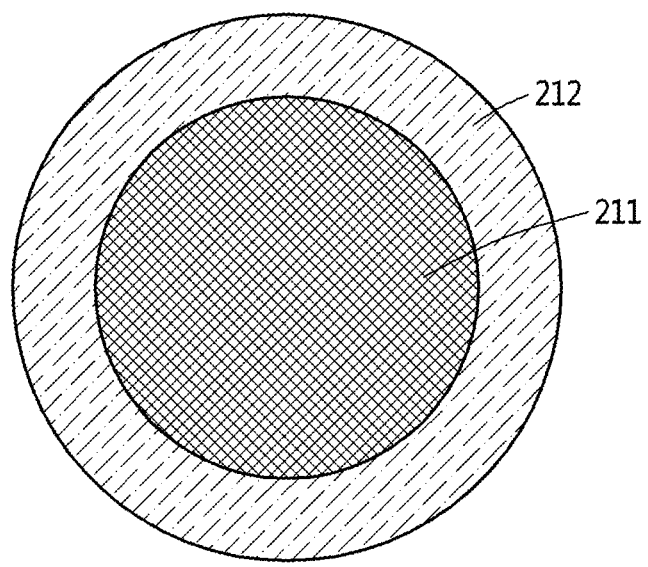

FIGS. 2A and 2B are diagrams illustrating a core and shell structure of a nano or microparticle forming the paint coating layer according to an embodiment of the present invention.

Referring to FIG. 2A, a nano or microparticle 200 in a paint for forming the paint coating layer according to an embodiment of the present invention may have a structure consisting of a core 201 and a shell 202.

For example, a material forming the core 201 and the shell 202 may include $SiO_2$, $Al_2O_3$, $CaCO_3$, $CaSO_4$, c-BN, $ZrO_2$, $MgHPO_4$, $Ta_2O_5$, AlN, LiF, $MgF_2$, $HfO_2$ and $BaSO_4$.

According to an embodiment of the present invention, the core 201 and the shell 202 may be formed of different materials, and may be formed in a combination having a synergistic effect with each other.

For example, the core 201 may be formed of at least one material of $SiO_2$, $Al_2O_3$, $CaCO_3$, $CaSO_4$, c-BN, $ZrO_2$, $MgHPO_4$, $Ta_2O_5$, AlN, LiF, $MgF_2$, $HfO_2$ and $BaSO_4$, and the shell 202 may be formed of at least one material of $SiO_2$, $Al_2O_3$, $CaCO_3$, $CaSO_4$, c-BN, $ZrO_2$, $MgHPO_4$, $Ta_2O_5$, AlN, LiF, $MgF_2$, $HfO_2$ and $BaSO_4$, and may be prepared in a paint form with a polymer.

For example, according to an embodiment of the present invention, the nano or microparticle is formed of the core 201 and the shell 202, and a nano or microparticle material forming the core 201 and a nano or microparticle material forming the shell 202 may be made of different materials.

In addition, the infrared emissivity and reflectance of the nano or microparticle material forming the core 201 and the infrared emissivity and reflectance of the nano or microparticle material forming the shell 202 may be determined so as to be complemented with each other for infrared emissivity and reflectance to incident sunlight in the wavelength range corresponding to the sky window.

Referring to FIG. 2B, a nano or microparticle 210 in a paint for forming the paint coating layer according to an embodiment of the present invention may have a structure consisting of a core 211 and a shell 212.

According to an embodiment of the present invention, the thickness of the shell 212 of the nano or microparticle 210 is adjusted to control at least one property of a reflective property, an absorption property, and a transmission property according to a difference in refractive index between the wavelength range corresponding to the sky window and the wavelength range of incident sunlight.

For example, when the thickness of the shell 212 of the nano or microparticle 210 is increased, the thickness of the paint coating layer may also be increased.

Figure 3:
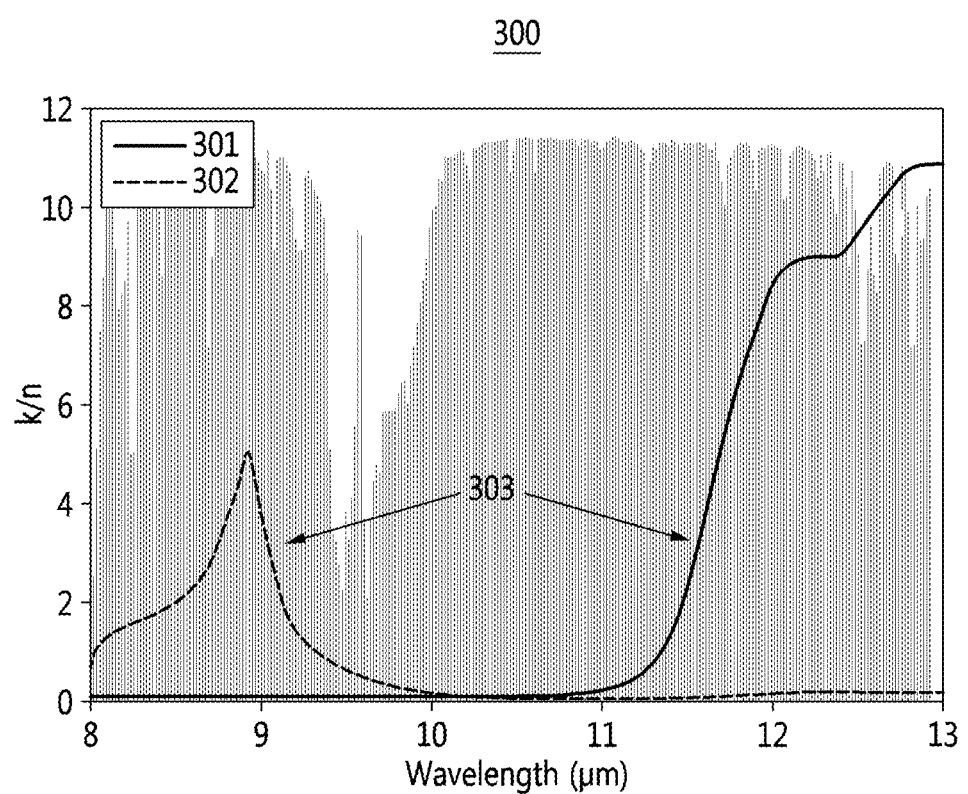
FIG. 3 is a diagram illustrating a ratio obtained by dividing an extinction coefficient for each wavelength by a refractive index of a thin film composed of nano or microparticles according to an embodiment of the present invention.

FIG. 3 is a diagram illustrating a ratio obtained by dividing an extinction coefficient for each wavelength by a refractive index of a thin film composed of nano or microparticles according to an embodiment of the present invention.

FIG. 3 illustrates a ratio obtained by dividing an extinction coefficient in each wavelength range by a refractive index of a thin film formed of $Al_2O_3$ and $SiO_2$ among nano or microparticles according to an embodiment of the present invention.

Referring to a graph 300 of FIG. 3, the graph 300 represents a ratio (k/n) by wavelength, a graph line 301 represents $Al_2O_3$, and a graph line 302 represents $SiO_2$.

Points 303 on the graph line 301 and the graph line 302 may represent complementary emission properties.

Since the graph line 301 is high after 12 μm and the graph line 302 is high at 8 to 10 μm, the graph line 301 represents an emission property after 12 μm and the graph line 302 represents an emission property at 8 to 10 μm.

Therefore, when $Al_2O_3$ and $SiO_2$ are mixed, these emission properties are superimposed to have high emissivity in the sky window area.

The above-described emission properties may be derived based on the following Equation 1.

$$R = \frac{(n_0 - n_1)^2 + k_1}{(n_0 + n_1)^2 + k_1^2} \quad \text{[Equation 1]}$$

In Equation 1, R may represent reflectance, $n_0$ may represent a refractive index of air, $n_1$ may represent a refractive index of a medium, and k may represent an extinction coefficient of a material.

Since the nano and microparticles also have a similar tendency for the refractive index and the extinction coefficient for each wavelength of a thin film, a mixture of these materials having optimized composition and particle sizes may have high emissivity in the entire sky window as a result.

Accordingly, the radiative cooling device according to an embodiment of the present invention may have high emissivity in the entire sky window.

For example, the emissivity in the entire atmospheric transparency window may also be economical in manufacturing and material costs due to a simple coating process such as blade coating and drop casting and rich materials.

FIGS. 4A to 4D are diagrams illustrating optical properties and cooling properties according to a volumetric ratio of the nano or microparticles forming the paint coating layer according to an embodiment of the present invention.

Figure 4A:
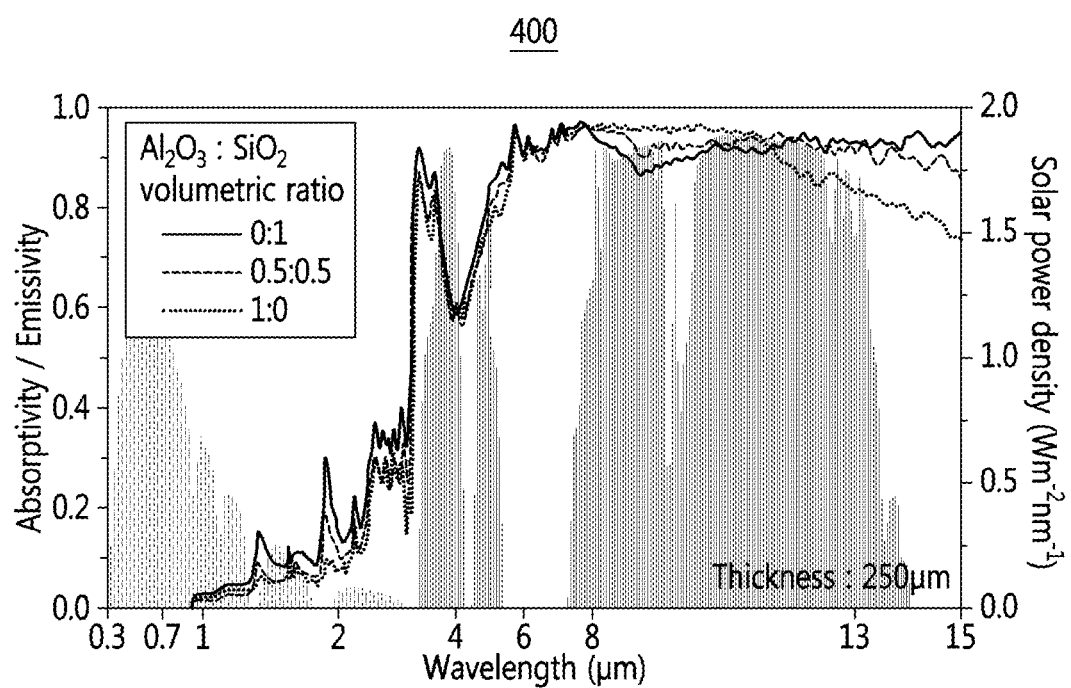
FIGS. 4A to 4D are diagrams illustrating optical properties and cooling properties according to a volumetric ratio of the nano or microparticles forming the paint coating layer according to an embodiment of the present invention.
Figure 4B:
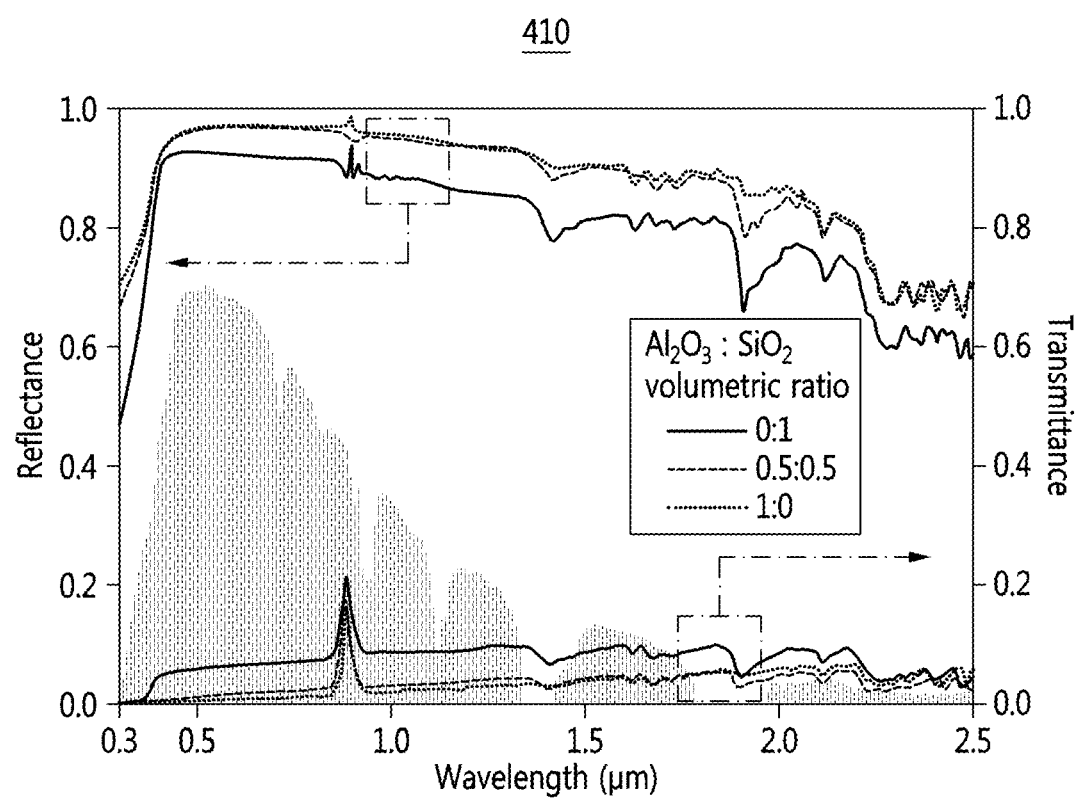
Figure 4C:
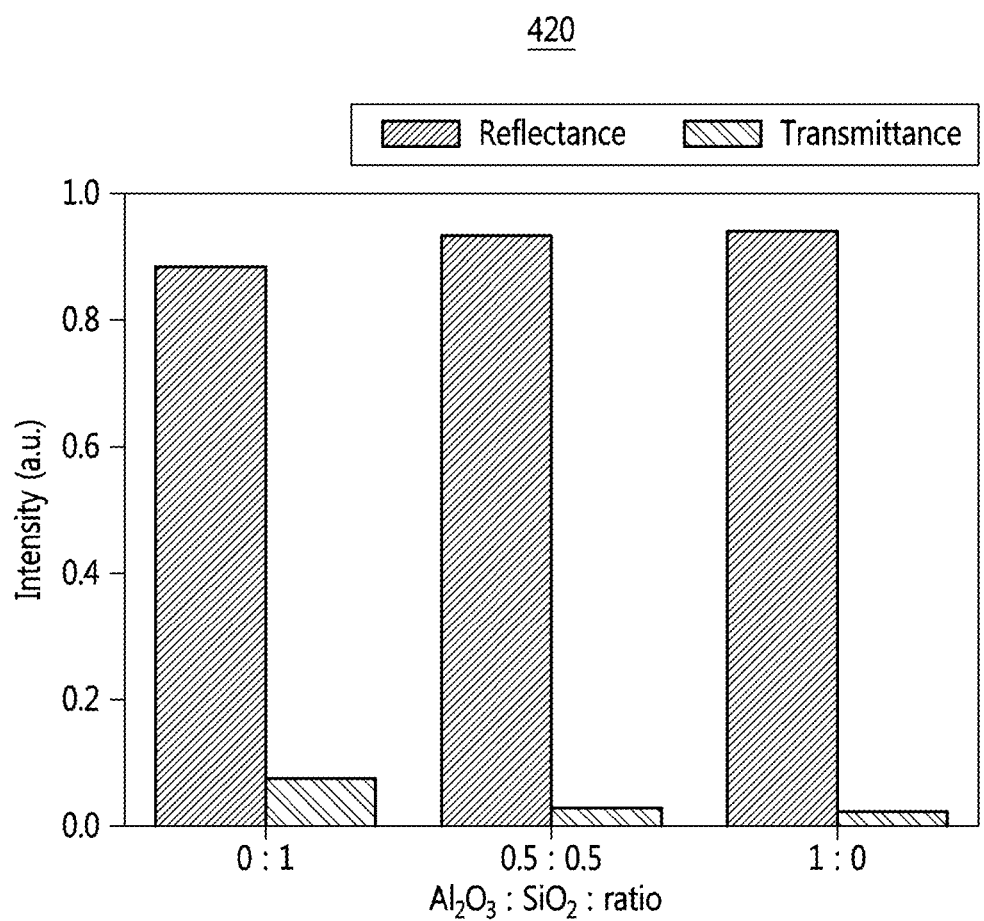

FIGS. 4A to 4C illustrate changes in optical properties according to a change in volumetric ratio of $Al_2O_3$ and $SiO_2$ when the thickness of the paint coating layer according to an embodiment of the present invention is 250 μm.

Figure 4D:
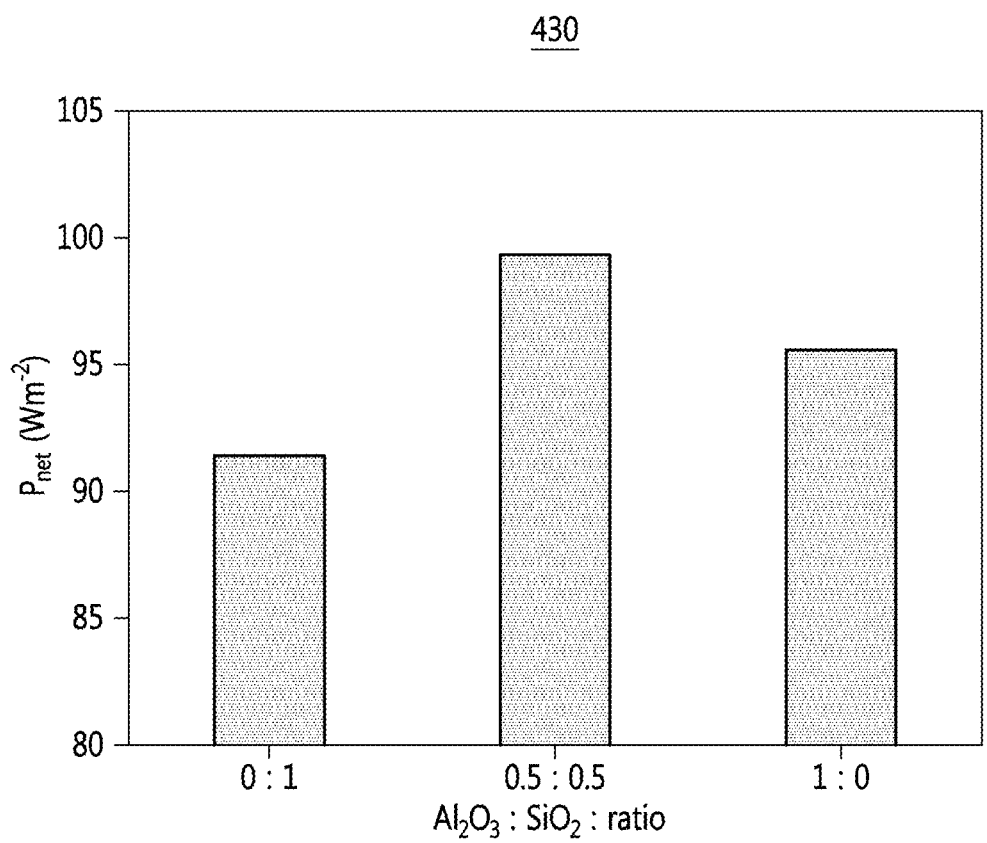

Meanwhile, FIG. 4D illustrates cooling properties according to a change in volumetric ratio of $Al_2O_3$ and $SiO_2$ when the thickness of the paint coating layer according to an embodiment of the present invention is 250 μm.

Referring to a graph 400 of FIG. 4A, when the ratios of $Al_2O_3$ and $SiO_2$ in the nano or microparticles forming the paint coating layer according to an embodiment of the present invention are 0:1, 0.5:0.5, and 1:0, changes in absorption/emissivity for each wavelength are illustrated.

It can be seen that when the ratio of $Al_2O_3$ and $SiO_2$ is 0.5:0.5 corresponding to 1:1, a graph line has high absorptivity/emissivity evenly in the wavelength range of the sky window.

Referring to a graph 410 of FIG. 4B, when the ratios of $Al_2O_3$ and $SiO_2$ in the nano or microparticles forming the paint coating layer according to an embodiment of the present invention are 0:1, 0.5:0.5, and 1:0, changes in reflectance for each wavelength are illustrated.

It can be seen that when the ratio of $Al_2O_3$ and $SiO_2$ is 0.5:0.5 corresponding to 1:1, a graph line has high reflectance evenly in the wavelength range of the sky window.

Referring to a graph 420 of FIG. 4B, when the ratios of $Al_2O_3$ and $SiO_2$ in the nano or microparticles forming the paint coating layer according to an embodiment of the present invention are 0:1, 0.5:0.5, and 1:0, changes in reflectance and transmittance for each wavelength are illustrated.

When reflectance and transmittance are considered together, it may be effective that the ratio of $Al_2O_3$ and $SiO_2$ is 0.5:0.5.

Referring to a graph 430 of FIG. 4D, when only $Al_2O_3$ is present, the solar reflectance and transmittance are similar to the volumetric ratio of 0.5:0.5, but the radiative cooling power is smaller than the volumetric ratio of 0.5:0.5 due to the low emissivity after 12 μm. For example, the volumetric ratio of 0.5:0.5 is equal to 1:1.

In addition, when only $SiO_2$ is present, the reflectance of sunlight is small and the radiative cooling power is small according to the properties of $SiO_2$, which is a relatively low refractive material.

In the case of the paint according to an embodiment of the present invention mixed in a volumetric ratio of 0.5:0.5, it can be seen that the reflectance to sunlight is high, the transmittance is low, and the radiative cooling power is also the highest.

Figure 5A:
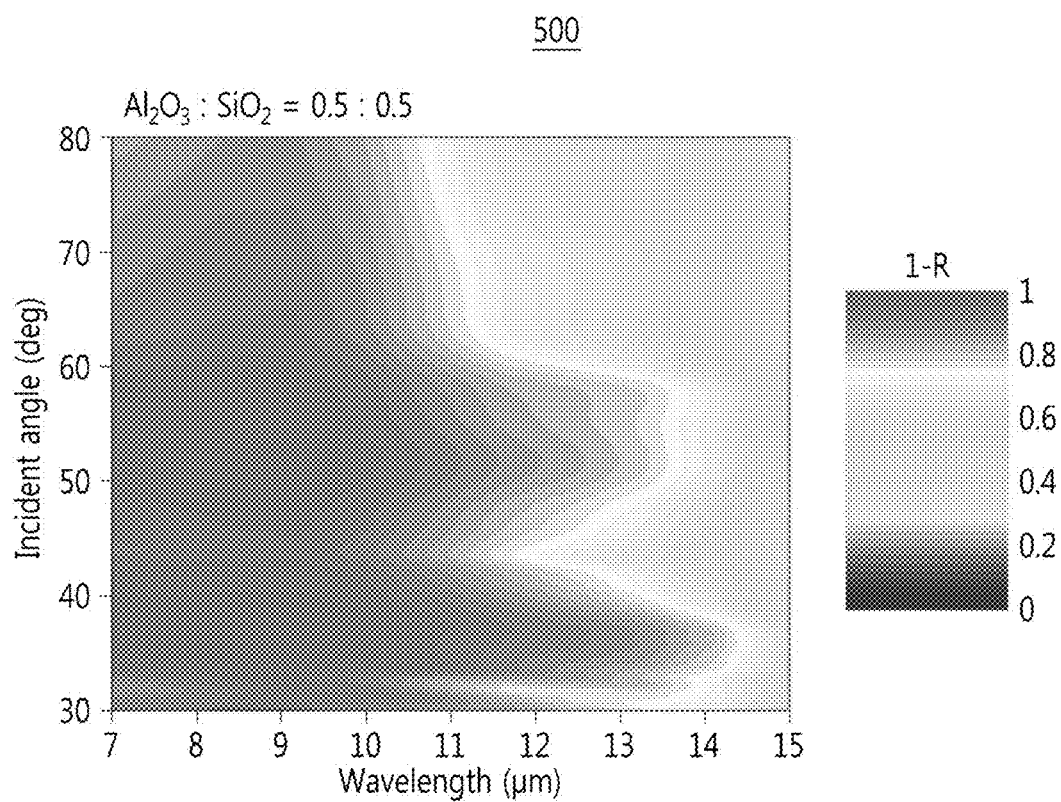
FIGS. 5A and 5B are diagrams illustrating emissivity for each angle according to a volumetric ratio of the nano or microparticles forming the paint coating layer according to an embodiment of the present invention.
Figure 5B:
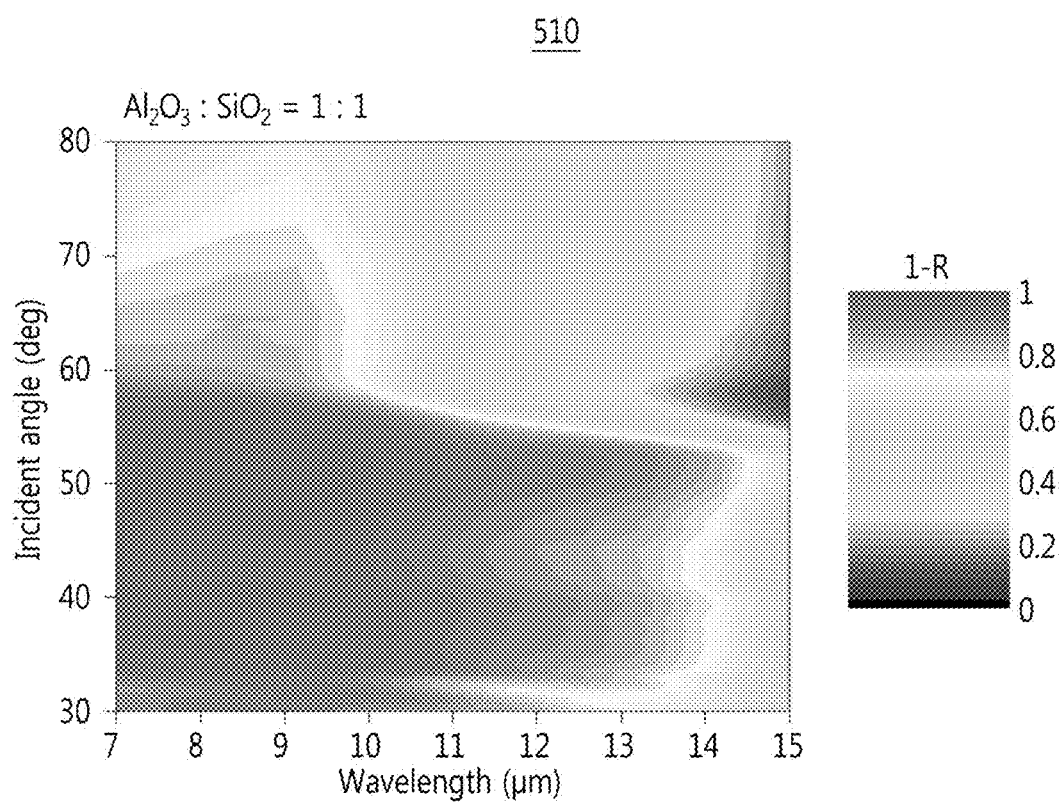

FIGS. 5A and 5B are diagrams illustrating emissivity for each angle according to a volumetric ratio of the nano or microparticles forming the paint coating layer according to an embodiment of the present invention.

FIG. 5A illustrates a case where the ratio of $Al_2O_3$ and $SiO_2$ in the nano or microparticles in the paint for forming the paint coating layer according to an embodiment of the present invention is 0.5:0.5.

FIG. 5B illustrates a case where the ratio of $Al_2O_3$ and $SiO_2$ in the nano or microparticles in the paint for forming the paint coating layer according to an embodiment of the present invention is 1:0.

A graph 500 of FIG. 5A and a graph 510 of FIG. 5B may represent a change in emissivity at an incident angle of sunlight for each wavelength. Here, the incident angle may be an incident angle of infrared rays.

For example, for an excellent radiative cooling capacity, the emissivity per angle needs also to be kept high.

In the case of the graph 510, the emissivity after 12 μm is low, and at a high angle, the emissivity is very low, and thus the emissivity is not maintained well.

Meanwhile, in the case of the graph 500, the emissivity after 12 μm is high, and at a high angle, the emissivity maintains high emissivity.

Therefore, it can be seen that the paint coating layer corresponding to the graph 500 emits radiative heat better.

Figure 6A:
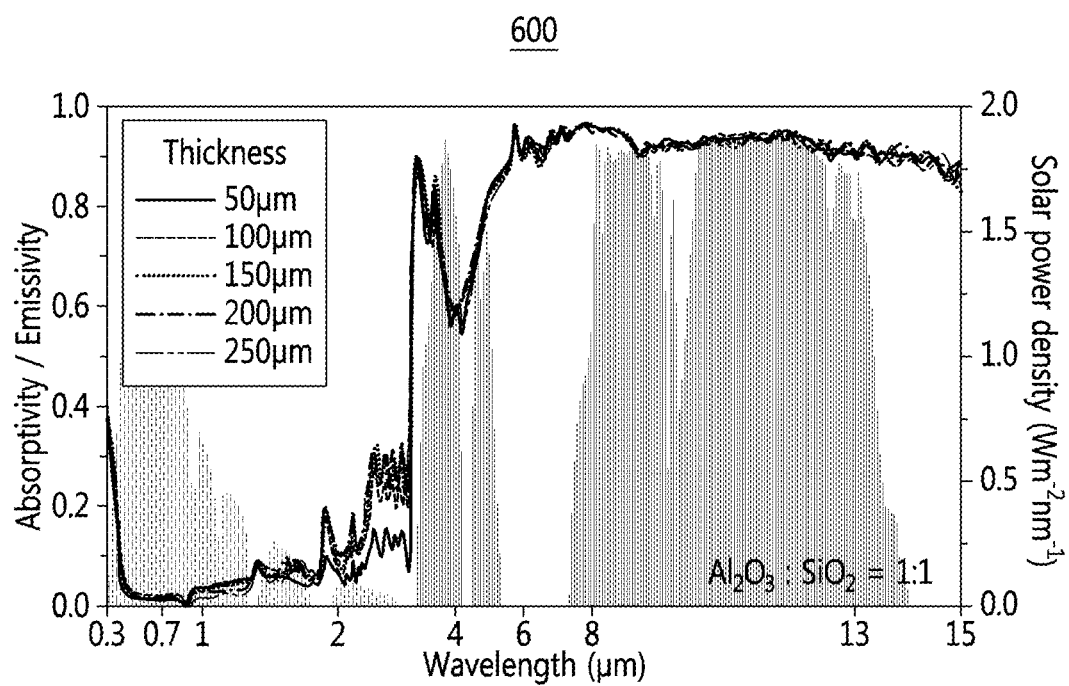
FIGS. 6A to 6C are diagrams illustrating optical properties and cooling properties according to a change in thickness of the paint coating layer according to an embodiment of the present invention.
Figure 6B:
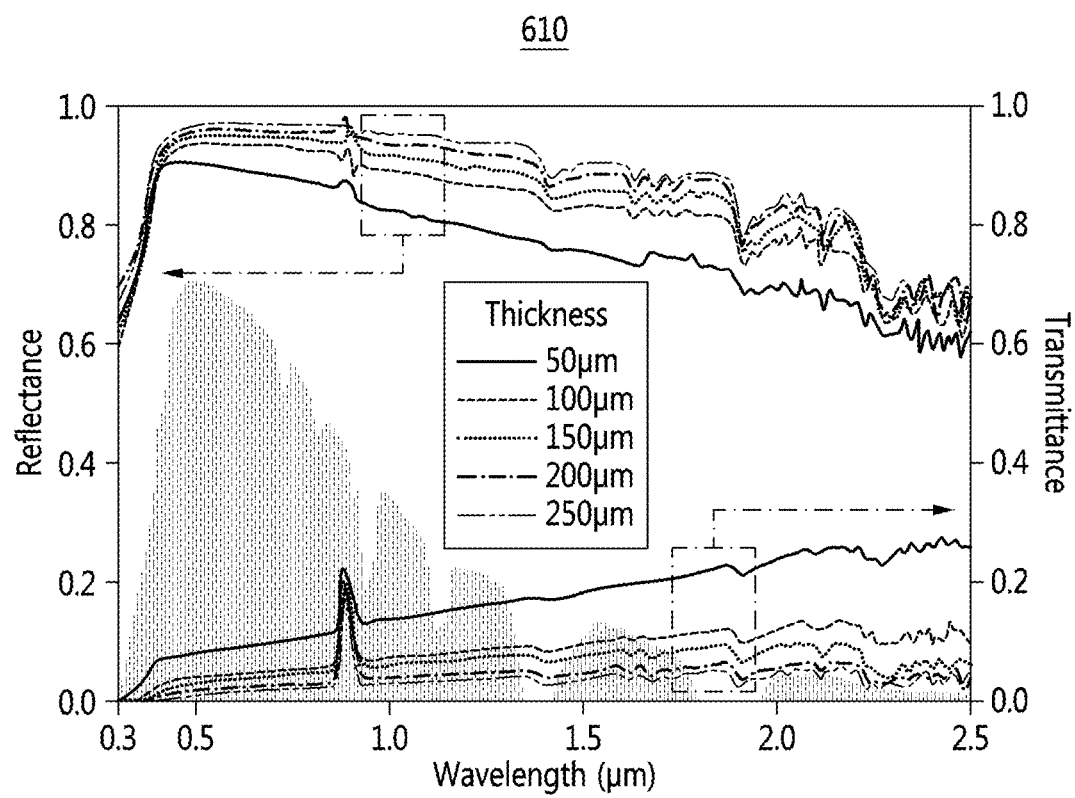
Figure 6C:
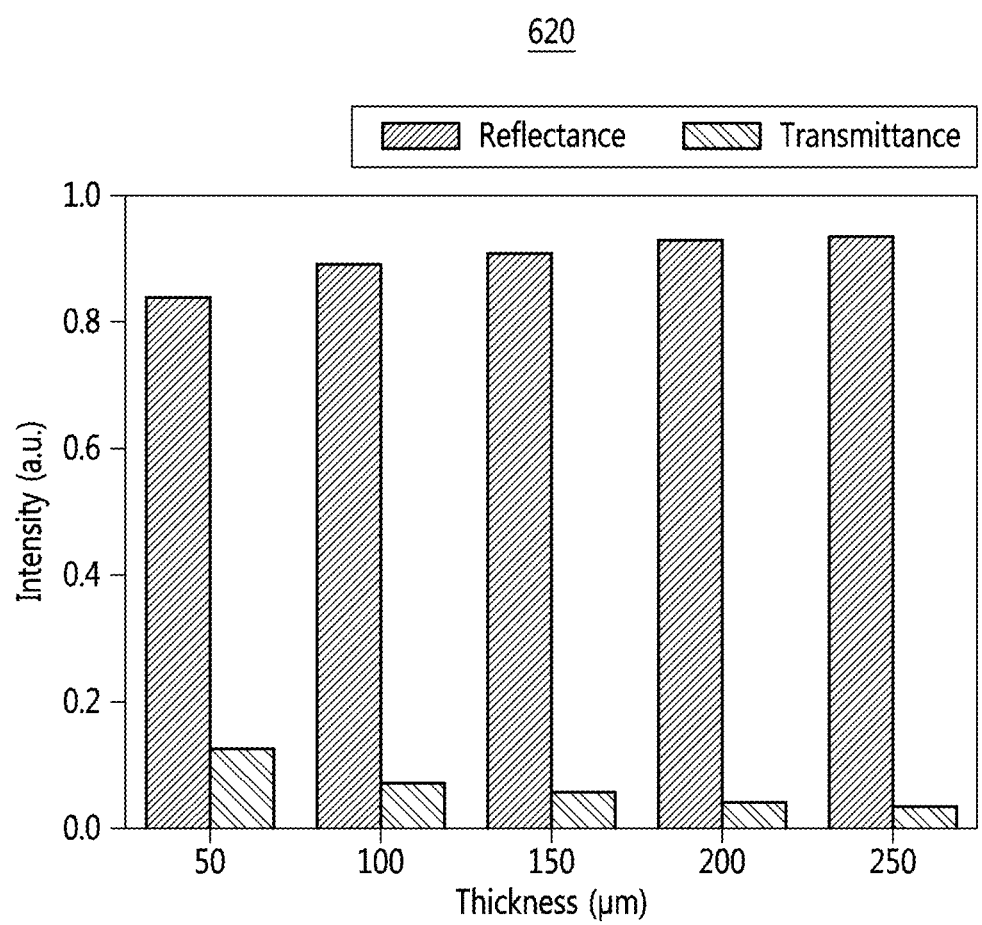

FIGS. 6A to 6C are diagrams illustrating optical properties and cooling properties according to a change in thickness of the paint coating layer according to an embodiment of the present invention.

In FIGS. 6A to 6C, there is illustrated an embodiment in which the thicknesses of the paint coating layer are 50 μm, 100 μm, 150 μm, 200 μm and 250 μm, and the paint coating layer is coated on a glass surface.

Preferably, the thickness of the paint coating layer may be formed from 30 μm to 600 μm.

FIG. 6A illustrates changes in absorptivity/emissivity for each wavelength according to a change in thickness of a paint coating layer formed using a paint in which a ratio of a mixture of $Al_2O_3$ and $SiO_2$ and a binder is 2:1 when a ratio of $Al_2O_3$ and $SiO_2$ is 1:1 according to an embodiment of the present invention. Here, the ratio of the mixture and the binder constitutes x:1, wherein x may be changed within a range of 0.2 to 2.5.

FIG. 6B illustrates changes in reflectance for each wavelength according to a change in thickness of a paint coating layer formed using a paint in which a ratio of a mixture of $Al_2O_3$ and $SiO_2$ and a binder is 2:1 when a ratio of $Al_2O_3$ and $SiO_2$ is 1:1 according to an embodiment of the present invention.

FIG. 6C illustrates changes in reflectance and transmittance for each wavelength according to a change in thickness of a paint coating layer formed using a paint in which a ratio of a mixture of $Al_2O_3$ and $SiO_2$ and a binder is 2:1 when a ratio of $Al_2O_3$ and $SiO_2$ is 1:1 according to an embodiment of the present invention.

In FIGS. 6A to 6C, the thicknesses of the paint coating layer are 50 μm, 100 μm, 150 μm, 200 μm, and 250 μm and the paint coating layer is coated on a glass surface.

Referring to a graph 600 of FIG. 6A, changes in absorptivity/emissivity according to a change in thickness are similar.

Referring to a graph 610 of FIG. 6B, the reflectance increases as the thickness increases.

Referring to a graph 620 of FIG. 6C, the reflectance of sunlight increases and the transmittance decreases.

Figure 7A:
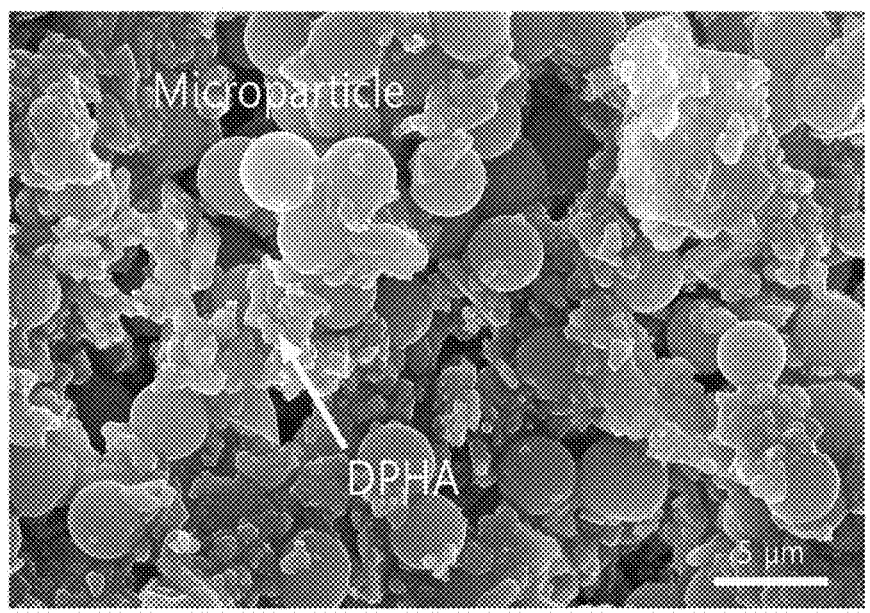
FIGS. 7A to 7C are diagrams illustrating various images of the paint coating layer according to an embodiment of the present invention.
Figure 7B:
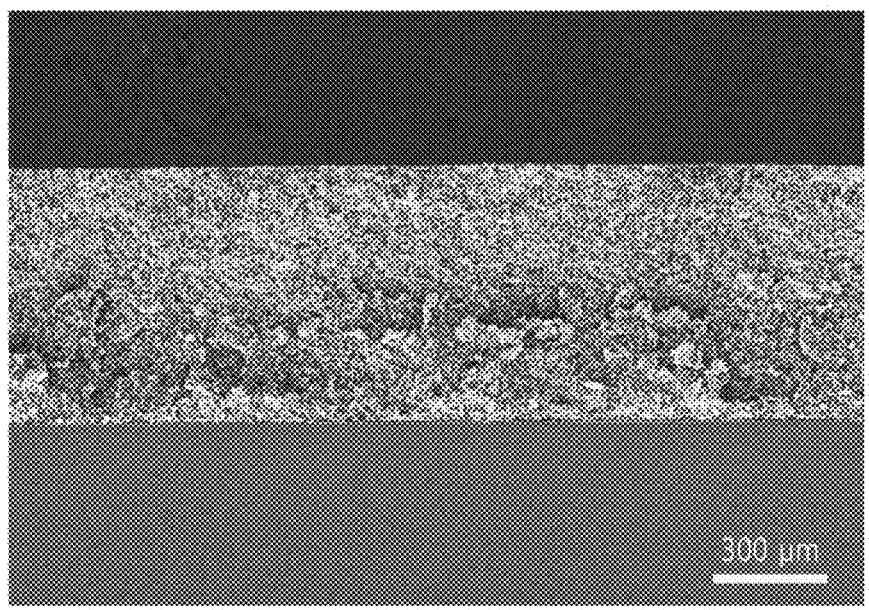
Figure 7C:
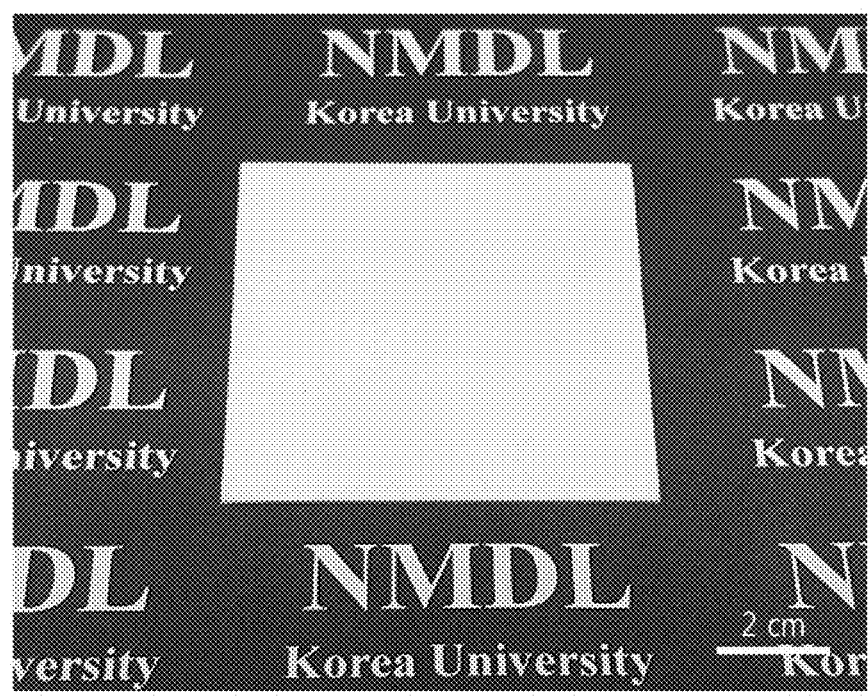

FIGS. 7A to 7C are diagrams illustrating various images of the paint coating layer according to an embodiment of the present invention.

FIG. 7A illustrates a scanning microscope image of a plane of the paint coating layer according to an embodiment of the present invention, and FIG. 7B illustrates a scanning microscope image of a fault plane of the paint coating layer according to an embodiment of the present invention.

FIG. 7C illustrates an image of a plate formed with a matte white appearance having high diffuse reflectance.

Referring to an image 700 of FIG. 7A and an image 710 of FIG. 7B, $Al_2O_3$ and $SiO_2$ particles are well bound with a support of a UV-cured DPHA binder used as a binder material between the particles.

Referring to an image 720 of FIG. 7C, it is confirmed that the matte white is important in reducing eye fatigue compared to a case of a passive daytime radiative cooling (PDRC) structure including an effective reflection of a solar flux and a metal mirror layer.

It can be seen that the image 720 has a matte white color rather than a silver surface such as a mirror.

The image 720 may represent an image formed by coating a conventional white paint to be compared with the paint material used for the paint coating layer according to an embodiment of the present invention.

In the image 700 of FIG. 7A and the image 710 of FIG. 7B, when the ratio of $Al_2O_3$ and $SiO_2$ is 1:1, the paint coating layer may be a paint coating layer formed using a paint in which a ratio of the mixture of $Al_2O_3$ and $SiO_2$ and the binder is 2:1.

Figure 8A:
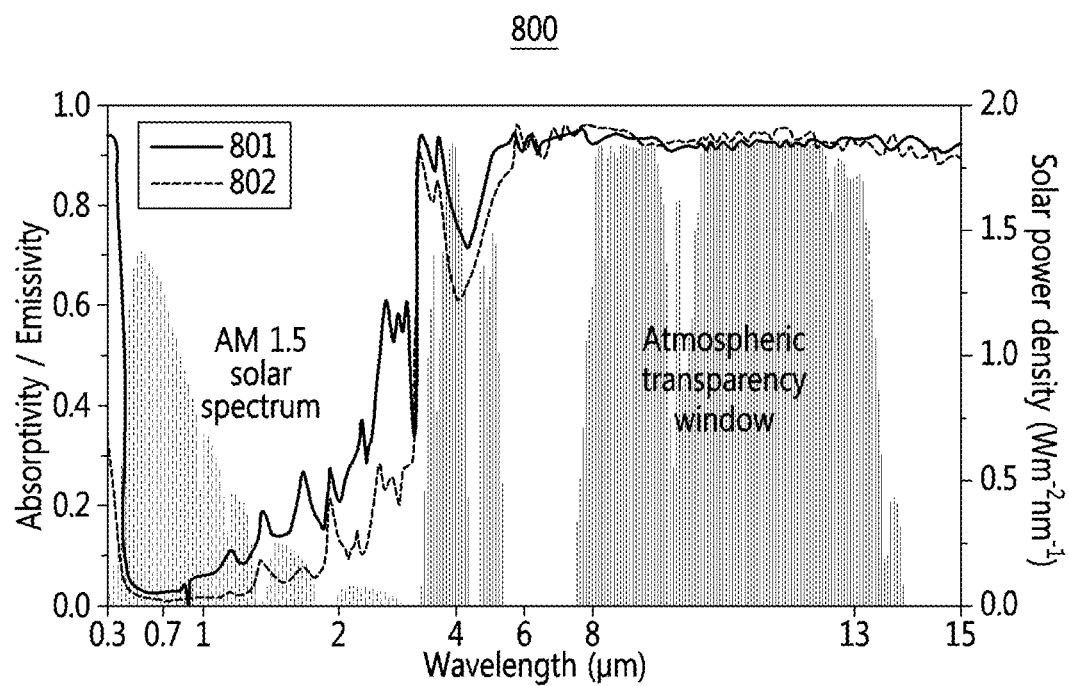
FIGS. 8A and 8B are diagrams illustrating optical properties and average emissivity for each angle in the sky window of the radiative cooling device including the paint coating layer according to an embodiment of the present invention.
Figure 8B:
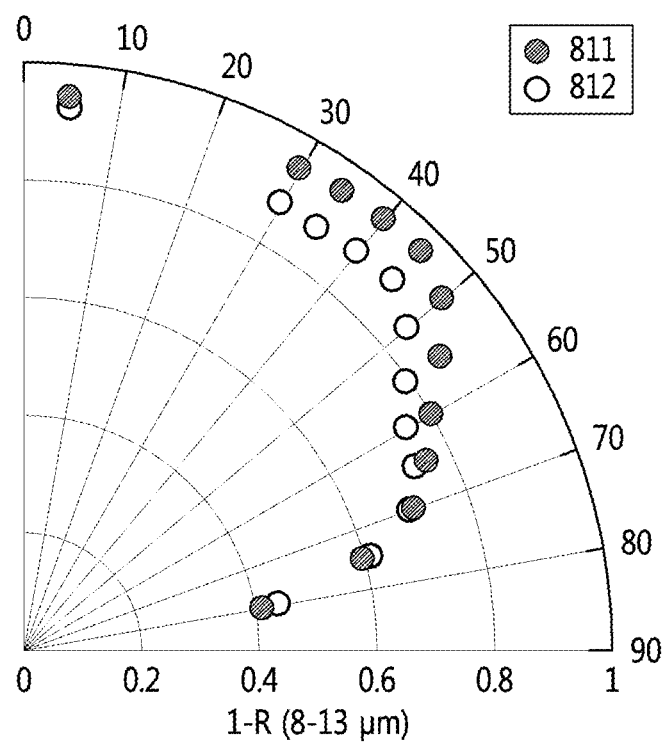

FIGS. 8A and 8B are diagrams illustrating optical properties and average emissivity for each angle in the sky window of the radiative cooling device including the paint coating layer according to an embodiment of the present invention.

FIG. 8A illustrates a comparison of optical properties related to radiative cooling performance of a white paint according to the related art and a paint according to an embodiment of the present invention.

Referring to a graph 800 of FIG. 8A, the white paint according to the related art corresponds to a graph line 801, and the paint according to an embodiment of the present invention corresponds to a graph line 802.

FIG. 8B illustrates a comparison of average emissivity for each angle in the sky window of a white paint according to the related art and a paint according to an embodiment of the present invention.

Referring to a graph 810 of FIG. 8B, the white paint according to the related art corresponds to an indicating point 811, and the paint according to an embodiment of the present invention corresponds to an indicating point 812.

When comparing the optical properties between the paint according to an embodiment of the present invention and the white paint, the paint according to an embodiment of the present invention absorbs less sunlight than the conventional white paint in a UV-near visible light region and an NIR region due to high bandgap energy and light scattering.

In addition, it can be seen that the average emissivity in the sky window of the paint according to an embodiment of the present invention is 93.5%, which is measured to be higher than 92.6% of the conventional white paint, and the average emissivity for each angle is also better in the paint according to an embodiment of the present invention.

More specifically, the conventional white paint consisting of $TiO_2$ particles and an acrylic binder exhibiting NIR band absorption showed the solar weight absorption of 0.112 and average emissivity of 0.924 in the atmospheric transparency window.

On the other hand, the paint according to an embodiment of the present invention exhibited extremely low solar weight absorption of 0.041 and high average emissivity of 0.935 due to the balanced composition and thickness of $Al_2O_3$ and $SiO_2$ particles and DPHA.

In addition, compared to the conventional white paint, the paint according to an embodiment of the present invention exhibits a strong emission property at an angle caused by harmonics of $Al_2O_3$ and $SiO_2$ particles to produce a high result of 0.8 at an incident angle of 60°.

FIGS. 9A to 9E are diagrams illustrating cooling power and cooling temperature of the radiative cooling device including the paint coating layer according to an embodiment of the present invention.

Figure 9A:
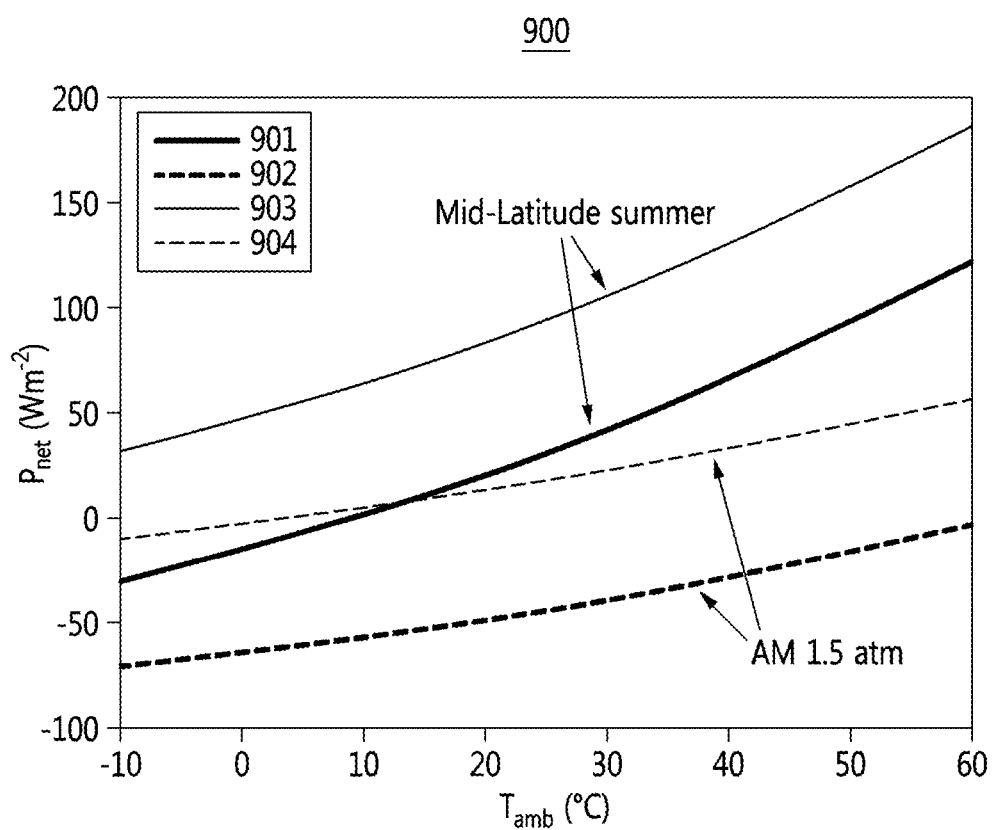
FIGS. 9A to 9E are diagrams illustrating cooling power and cooling temperature of the radiative cooling device including the paint coating layer according to an embodiment of the present invention.

FIG. 9A illustrates a comparison of an ambient temperature to net cooling power in a paint for forming the paint coating layer according to an embodiment of the present invention and a white paint according to the related art. In the following description, for convenience of description, the paint for forming the paint coating layer according to an embodiment of the present invention is referred to as a radiative cooling paint.

Figure 9B:
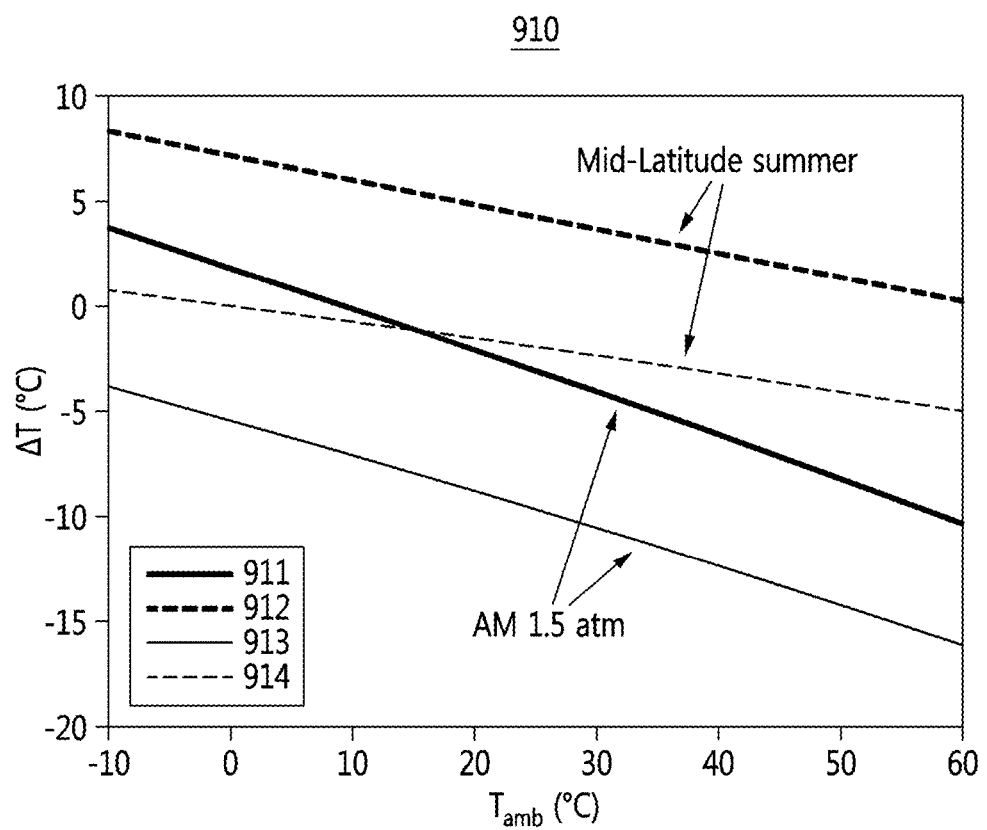

FIG. 9B illustrates a comparison of an ambient temperature to a cooling temperature in a radiative cooling paint according to an embodiment of the present invention and a white paint according to the related art.

Figure 9C:
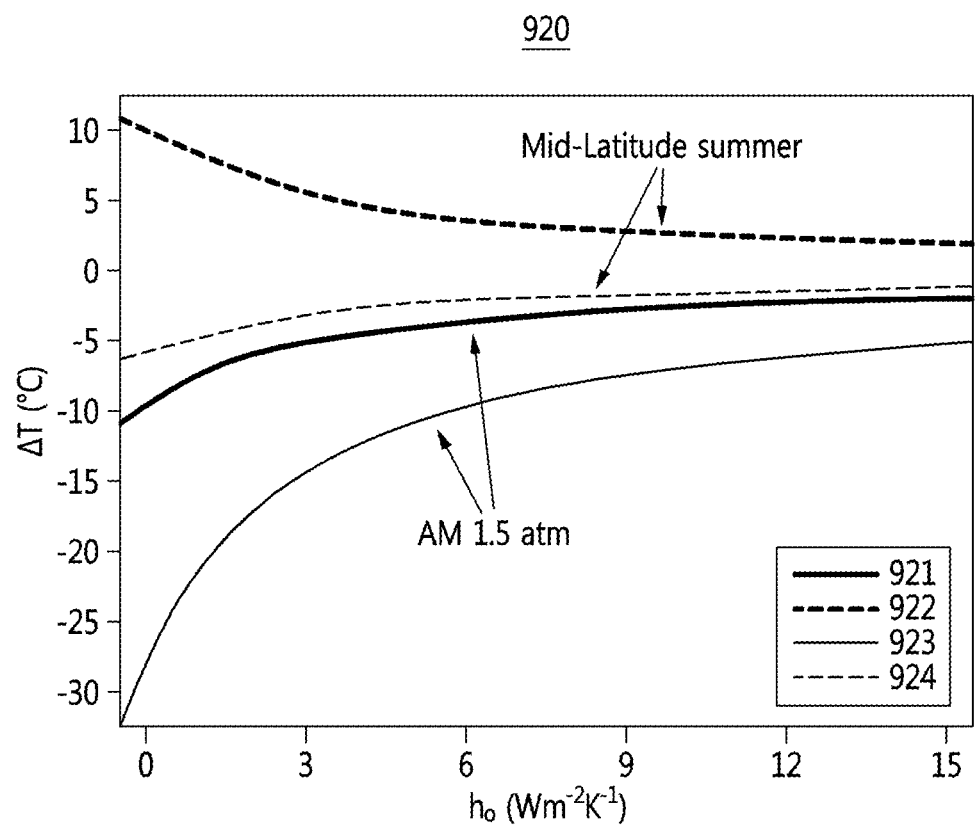

FIG. 9C illustrates a comparison of a heat transfer coefficient to a cooling temperature in a radiative cooling paint according to an embodiment of the present invention and a white paint according to the related art.

Figure 9D:
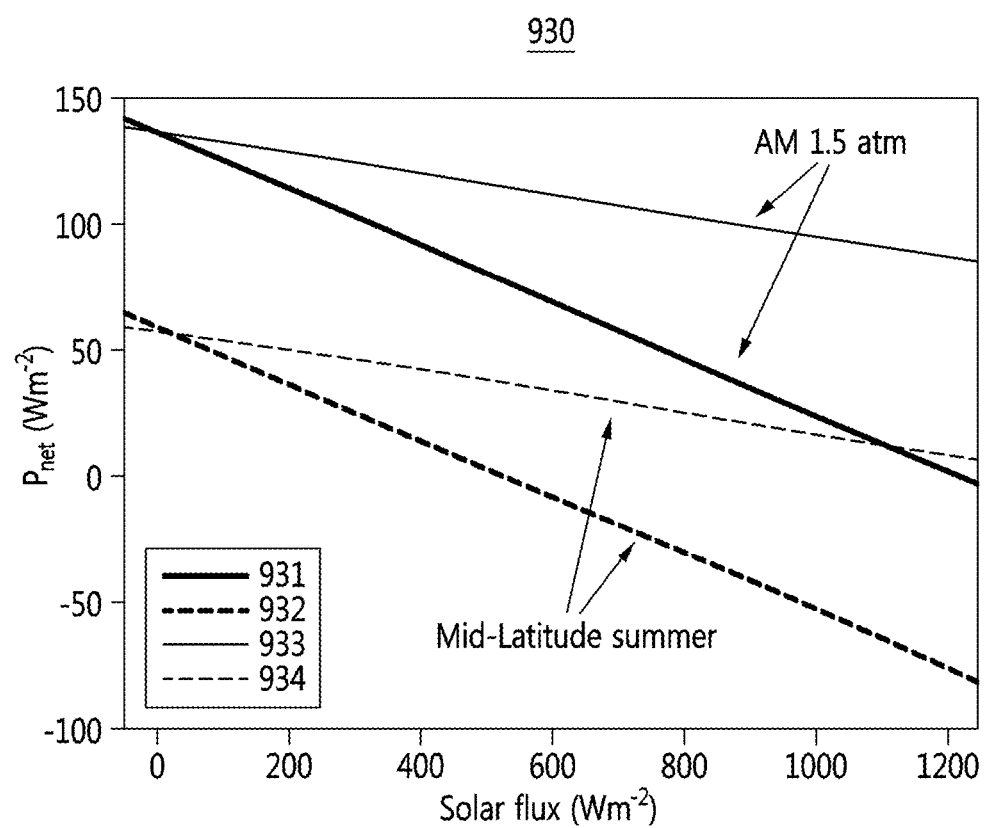

FIG. 9D illustrates a comparison of a solar flux to net cooling power in a radiative cooling paint according to an embodiment of the present invention and a white paint according to the related art.

Figure 9E:
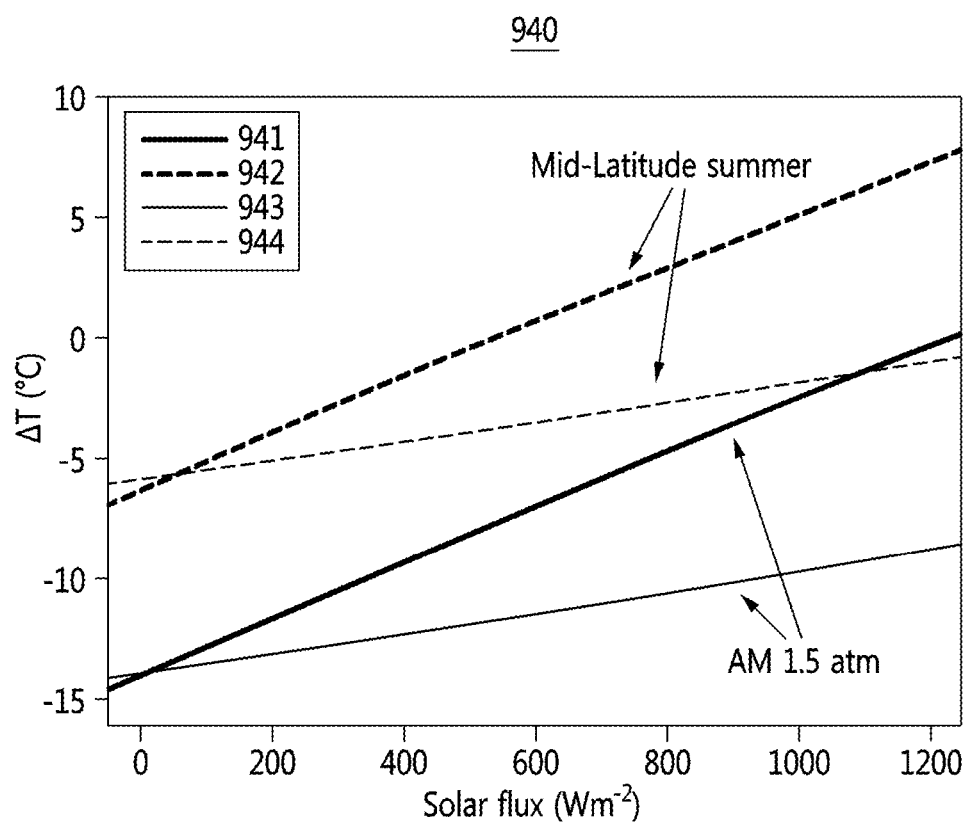

FIG. 9E illustrates a comparison of a solar flux to a cooling temperature in a radiative cooling paint according to an embodiment of the present invention and a white paint according to the related art.

In the graphs of FIGS. 9A to 9E, commonly, measurement results of changes in temperature of a radiative cooling paint and a white paint according to the related art are illustrated with respect to a mid-latitude summer and an air mass (AM) of 1.5, and it is shown that the radiative cooling paint of the present invention has excellent radiative cooling performance compared to the white paint according to the related art.

Referring to a graph 900 of FIG. 9A, a graph line 901 and a graph line 902 represent changes in net cooling power of the white paint according to the related art depending on a change in ambient temperature, and a graph line 903 and a graph line 904 represent changes in net cooling power of the radiative cooling paint according to an embodiment of the present invention depending on a change in ambient temperature.

Referring to a graph 910 of FIG. 9B, a graph line 911 and a graph line 912 represent changes in cooling temperature of the white paint according to the related art depending on a change in ambient temperature, and a graph line 913 and a graph line 914 represent changes in cooling temperature of the radiative cooling paint according to an embodiment of the present invention depending on a change in ambient temperature.

Referring to a graph 920 of FIG. 9C, a graph line 921 and a graph line 922 represent changes in cooling temperature of the white paint according to the related art depending on a heat transfer coefficient, and a graph line 923 and a graph line 924 represent changes in cooling temperature of the radiative cooling paint according to an embodiment of the present invention depending on a heat transfer coefficient.

Referring to a graph 930 of FIG. 9D, a graph line 931 and a graph line 932 represent changes in net cooling power of the white paint according to the related art depending on a solar flux, and a graph line 933 and a graph line 934 represent changes in net cooling power of the radiative cooling paint according to an embodiment of the present invention depending on a solar flux.

Referring to a graph 940 of FIG. 9E, a graph line 941 and a graph line 942 represent changes in cooling temperature of the white paint according to the related art depending on a solar flux, and a graph line 943 and a graph line 944 represent changes in cooling temperature of the radiative cooling paint according to an embodiment of the present invention depending on a solar flux.

Specifically, referring to the graphs of FIGS. 9A to 9E, the radiative cooling paint according to an embodiment of the present invention has higher net cooling power and a lower ambient temperature under all conditions than the white paint according to the related art.

It is confirmed that this difference in net cooling power and ambient temperature between the white paint according to the related art and the radiative cooling paint according to an embodiment of the present invention mainly occurs in a solar absorptivity value.

Therefore, the radiative cooling paint according to an embodiment of the present invention may provide better radiative cooling performance in summer than in winter.

The above-described net cooling power may be derived using radiative power $P_{rad}$, atmospheric emission power $P_{atm}$, solar absorption power $P_{sun}$, and power loss due to conduction and convection.

The radiative power $P_{rad}$ is hemispherical radiative power emitted from the surface of the radiative cooling device, and may be calculated based on the following Equation 2.

$$P_{rad}(T) = \int_0^{2\pi}\int_0^{\frac{\pi}{2}}\int_0^{\infty} I_{BB}(T, \lambda)\varepsilon(\lambda, \theta)\cos\theta\sin\theta d\lambda d\theta d\varphi \qquad [\text{Equation 2}]$$

In Equation 2, $I_{BB}$ may represent a blackbody radiation intensity, and T may represent a temperature.

For example, the atmospheric emission power $P_{atm}$ is a power loss due to atmospheric radiative adsorption of the radiative cooling device, and may be calculated based on the following Equation 3.

$$P_{atm}(T_{atm}) = \qquad [\text{Equation 3}]$$
$$\int_0^{2\pi}\int_0^{\frac{\pi}{2}}\int_0^{\infty} I_{BB}(T_{atm}, \lambda)\varepsilon(\lambda, \theta)\varepsilon_{atm}(\lambda, \theta)\cos\theta\sin\theta d\lambda d\theta d\varphi$$

In Equation 3, $I_{BB}$ may represent a blackbody radiation intensity, and $T_{atm}$ may represent an ambient temperature.

For example, the solar absorption power $P_{sun}$ is a power loss due to solar adsorption of the radiative cooling device, and may be calculated based on the following Equation 4.

$$P_{sun} = \int_0^{\infty} I_{AM1.5}(\lambda)\varepsilon(\lambda,\theta)d\lambda \qquad [\text{Equation 4}]$$

In Equation 4, $I_{AM1.5}$ may represent a solar density condition, and AM1.5 may represent 1.5 times of air weight of an air layer.

For example, the net cooling power $P_{net}$ may be expressed by the following Equation 5 based on the law of conservation of energy.

$$P_{net}(T) = P_{rad}(T) - P_{atm}(T_{atm}) - P_{sun} - P_{non-rad} \qquad [\text{Equation 5}]$$

In Equation 5, $P_{net}$ may represent net cooling power, $P_{rad}$ may represent radiative power, $P_{atm}$ may represent atmospheric emission power, $P_{sun}$ may represent solar absorption power, and $P_{non-rad}$ may represent a power loss due to conduction and convection.

In other words, referring to FIGS. 9A to 9E, the radiative cooling paint according to an embodiment of the present invention has a cooling temperature lower than that of the white paint according to the related art by at least 4°.

This difference is mostly due to solar absorption. As the solar power increases, the radiative cooling paint performs the cooling better than the conventional white paint to have relatively excellent radiative cooling performance.

FIGS. 10A to 10F are diagrams illustrating a surface cooling measurement experiment of the radiative cooling device including the paint coating layer according to an embodiment of the present invention.

Figure 10A:
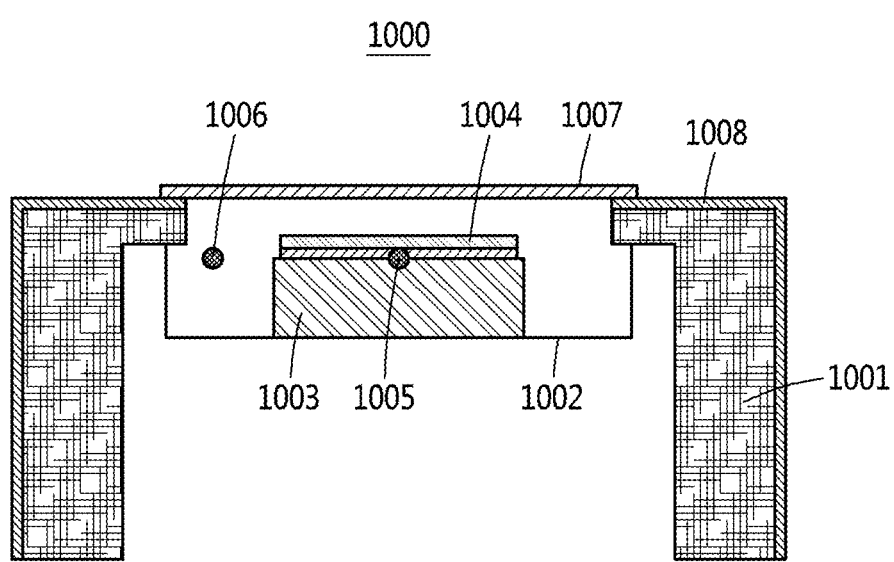
FIGS. 10A to 10F are diagrams illustrating a surface cooling measurement experiment of the radiative cooling device including the paint coating layer according to an embodiment of the present invention.

FIG. 10A illustrates a schematic diagram for a surface cooling measurement experiment of the radiative cooling device including the paint coating layer according to an embodiment of the present invention.

Referring to FIG. 10A, in a surface cooling measurement experiment environment 1000, a transparent acrylic plate 1002 is located between wood frames 1001, a polystyrene 1003 is located on the transparent acrylic plate 1002, and a sample 1004 is located on the polystyrene 1003, and the sample 1004 and the polystyrene 1003 are bound to each other by a thermometer 1005.

A thermometer 1006 is present therein, a low-density polystyrene 1007 is covered, and fixed by an aluminum curtain 1008.

The thermometer 1005 measures a temperature under the radiative cooling device, and the thermometer 1006 measures a temperature in the air.

Figure 10B:
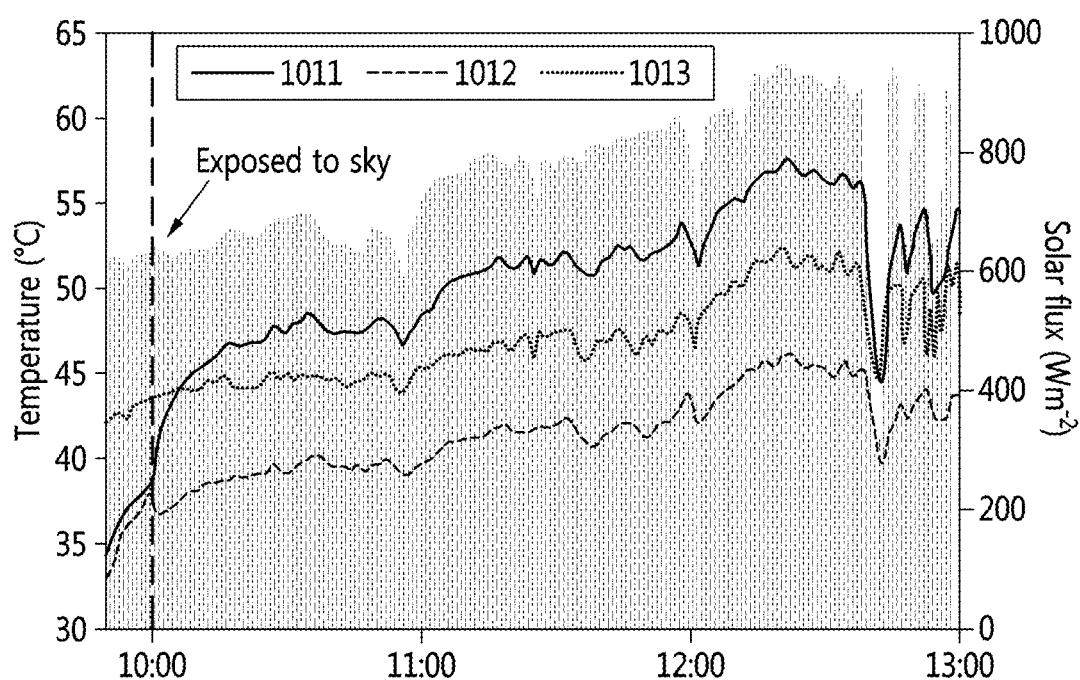

FIG. 10B illustrates changes in temperature in the air and changes in solar flux in a paint for forming the paint coating layer according to an embodiment of the present invention and a conventional white paint.

Referring to a graph 1010 of FIG. 10B, a graph line 1011 representing the conventional white paint and a graph line 1013 representing the air increase in temperature over time, and a temperature increase width of the graph line 1011 is bigger.

On the other hand, a graph line 1012 representing the paint according to an embodiment of the present invention has a relatively small temperature increase width over time, and has a lower temperature than the graph line 1011 and the graph line 1013. That is, the paint according to an embodiment of the present invention has cooling performance.

Figure 10C:
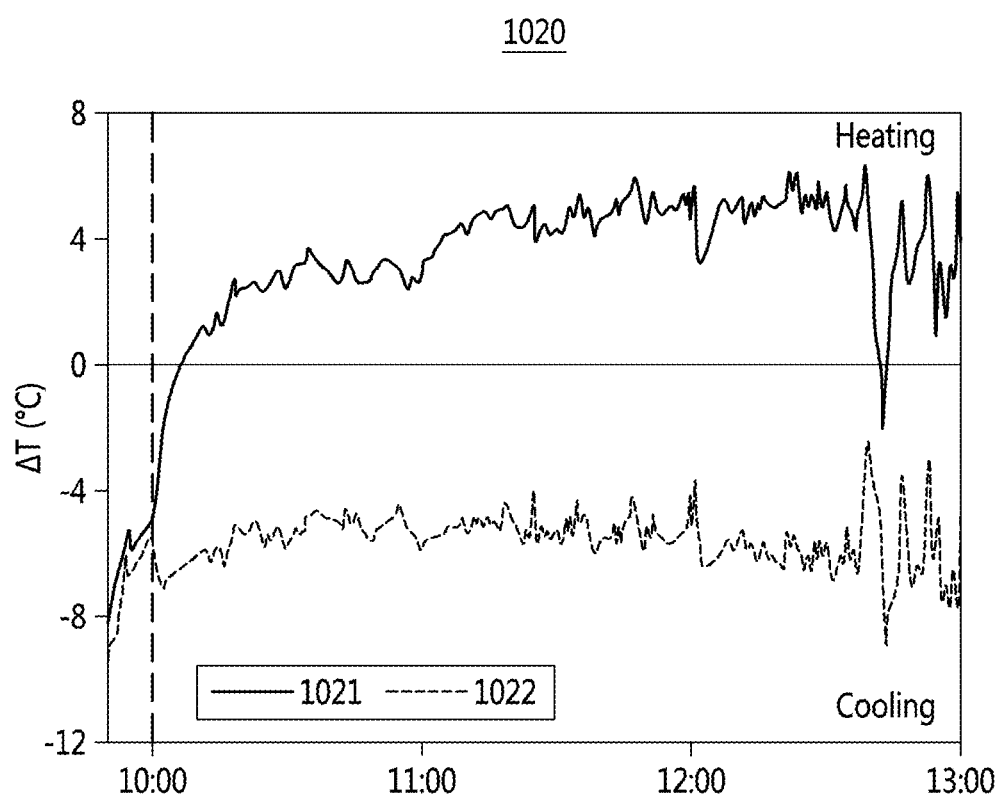

FIG. 10C illustrates a comparison of only changes in temperature between the paint for forming the paint coating layer according to an embodiment of the present invention and the conventional white paint.

Referring to a graph 1020 of FIG. 10C, a graph line 1021 representing the conventional white paint represents a heating effect, and a graph line 1022 representing the paint according to an embodiment of the present invention represents a cooling effect.

Figure 10D:
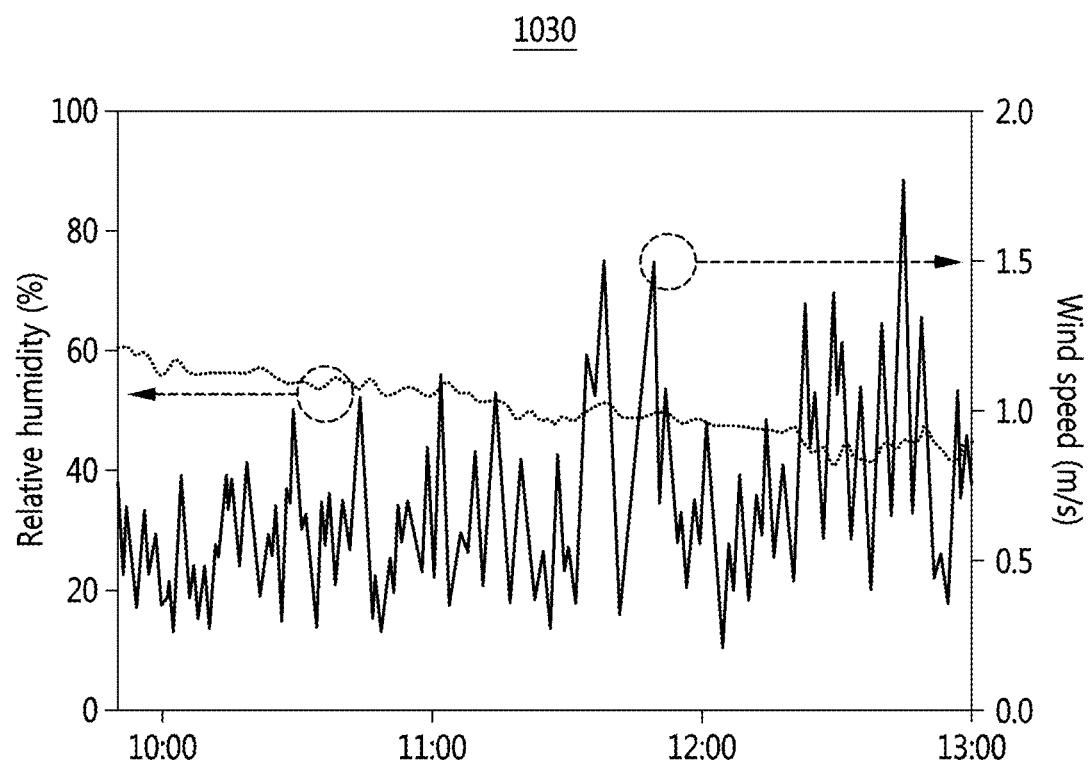

FIG. 10D illustrates humidity and wind strength in a surface cooling measurement experiment of the radiative cooling device including the paint coating layer according to an embodiment of the present invention.

Figure 10E:
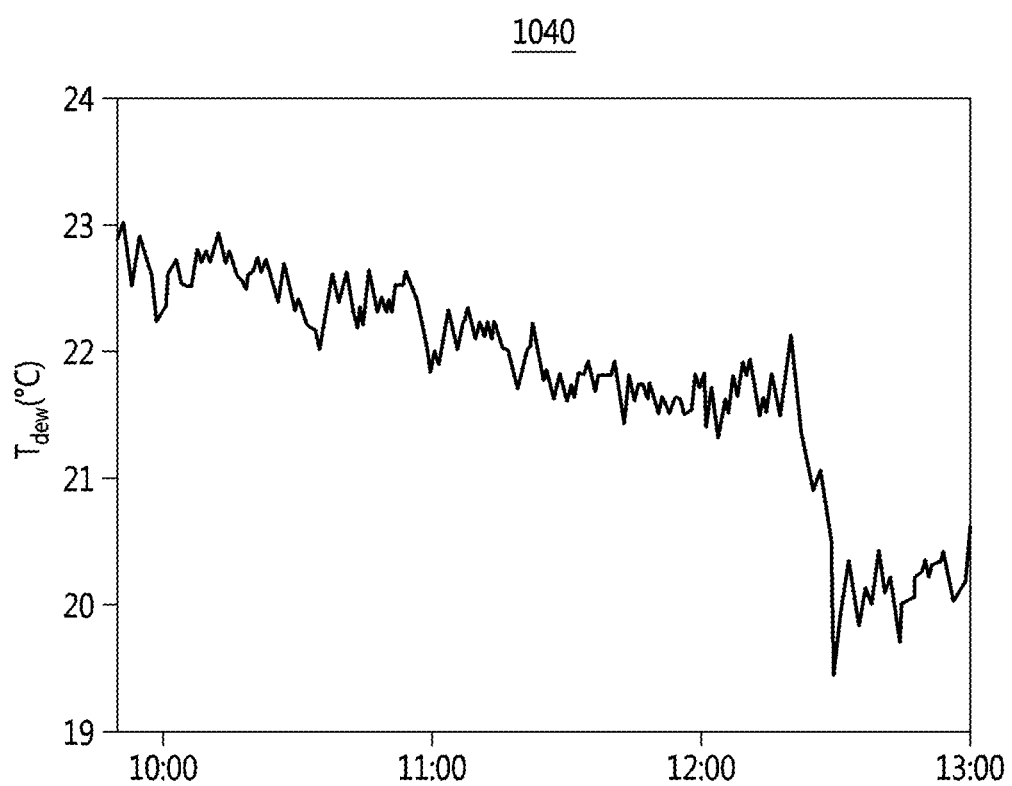

FIG. 10E illustrates changes in dew point temperature in a surface cooling measurement experiment of the radiative cooling device including the paint coating layer according to an embodiment of the present invention.

Referring to a graph 1030 of FIG. 10D, the humidity has a range of 60% to 45%, and the change in wind speed is not large.

Referring to a graph 1040 of FIG. 10E, the dew point temperature decreases over time.

Figure 10F:
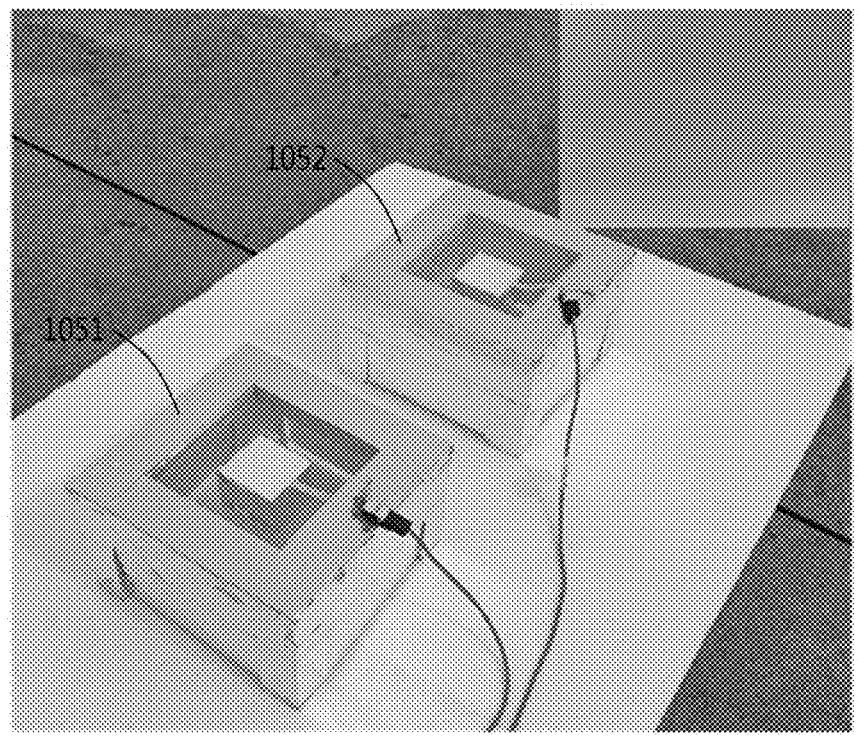

FIG. 10F illustrates a sample 1051 coated with the white paint and a sample 1052 coated with the paint according to an embodiment of the present invention in an external environment 1050 of the surface cooling measurement experiment, and the upper right side illustrates a sky image in the external environment of the experiment.

Specifically, temperature values measured between 11:00 and 13:00 were used to find average and minimum temperature changes because the sample was exposed after 10:00.

A minimum temperature change (ΔT) of the sample 1051 when the cloud covered the solar flux was −2.1° C., and the sample 1052 had temperature drops of 5.6° C. and 8.8° C. with respect to the average and minimum temperature change ΔT by maintaining an ambient temperature or less with a significant PDRC effect even at a high dew point harmful to PDRC, respectively.

Accordingly, the present invention may provide a radiative cooling device which cools below an ambient temperature without energy consumption even in the day time when the sun is shining or the night time when the sun is not shining.

FIGS. 11A to 11F are diagrams illustrating a water cooling measurement experiment of the radiative cooling device including the paint coating layer according to an embodiment of the present invention.

Figure 11A:
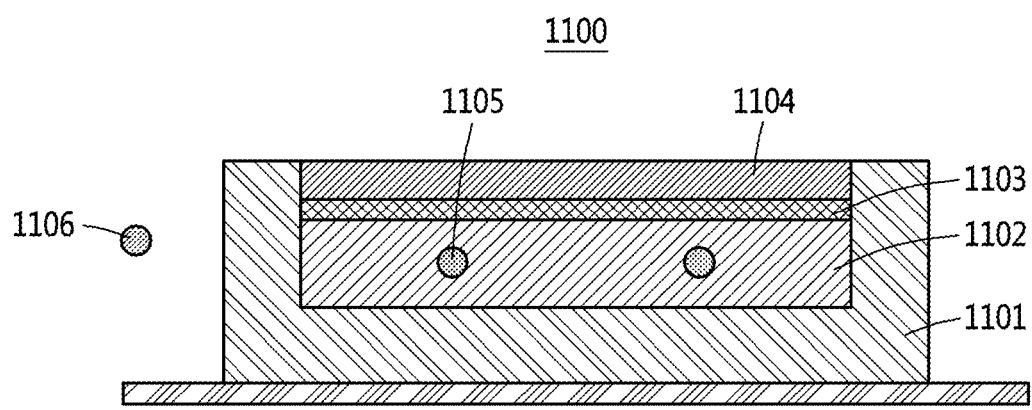
FIGS. 11A to 11F are diagrams illustrating a water cooling measurement experiment of the radiative cooling device including the paint coating layer according to an embodiment of the present invention.

FIG. 11A illustrates a schematic diagram for a water cooling measurement experiment of the radiative cooling device including the paint coating layer according to an embodiment of the present invention.

Referring to FIG. 11A, in a water cooling measurement experiment environment 1100, water 1102 is located inside a polystyrene 1101, an aluminum plate 1103 is located on the water 1102, and a paint 1104 according to an embodiment of the present invention is coated on the aluminum 1103. For example, the paint according to an embodiment of the present invention may be referred to as a radiative cooling paint, and in the following description, will be referred to as a radiative cooling paint.

The water 1102 has a depth of about 10 nm, and a thermometer 1105 is placed.

The aluminum plate 1103 has a thickness of about 1 nm, the radiative cooling paint 1104 is coated with a thickness of microns, and the temperature in the air is measured by a thermometer 1106.

Figure 11B:
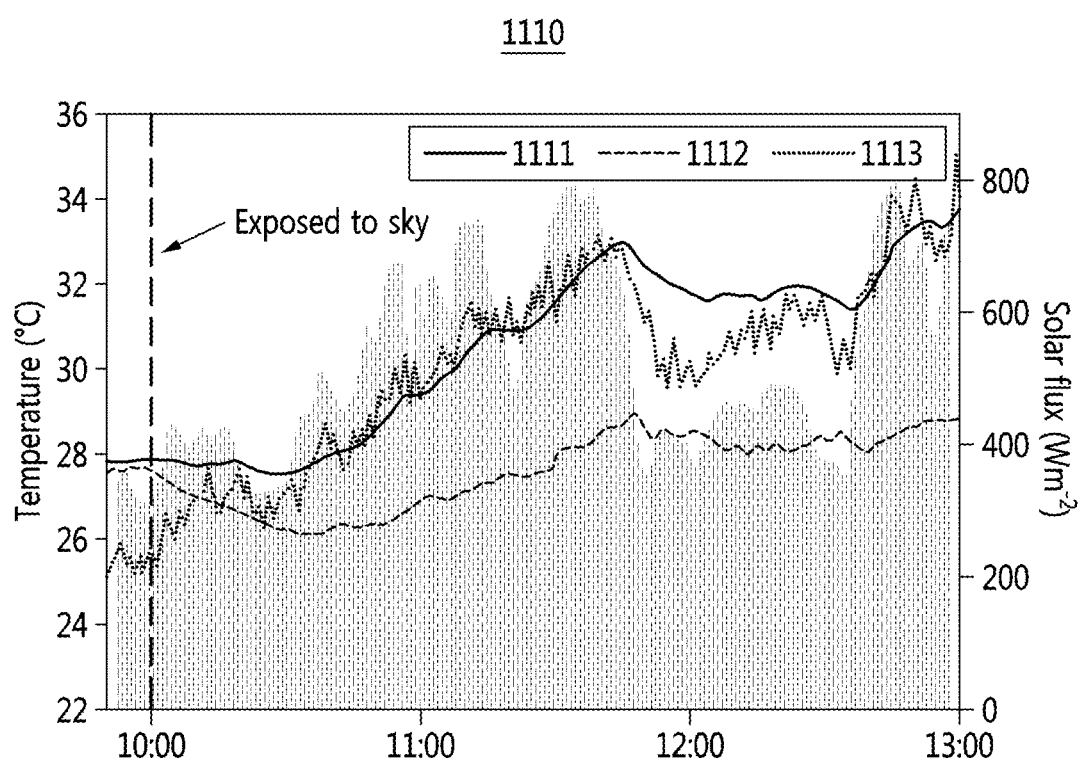

FIG. 11B illustrates changes in temperature in the air and changes in solar flux in a radiative cooling paint according to an embodiment of the present invention and a conventional white paint.

Referring to a graph 1110 of FIG. 11B, a graph line 1111 representing the conventional white paint and a graph line 1113 representing air increase in temperature over time. On the other hand, a graph line 1112 representing the radiative cooling paint according to an embodiment of the present invention has a relatively small temperature increase width over time, and has a lower temperature than the graph line 1111 and the graph line 1113. That is, the radiative cooling paint according to an embodiment of the present invention has cooling performance.

Figure 11C:
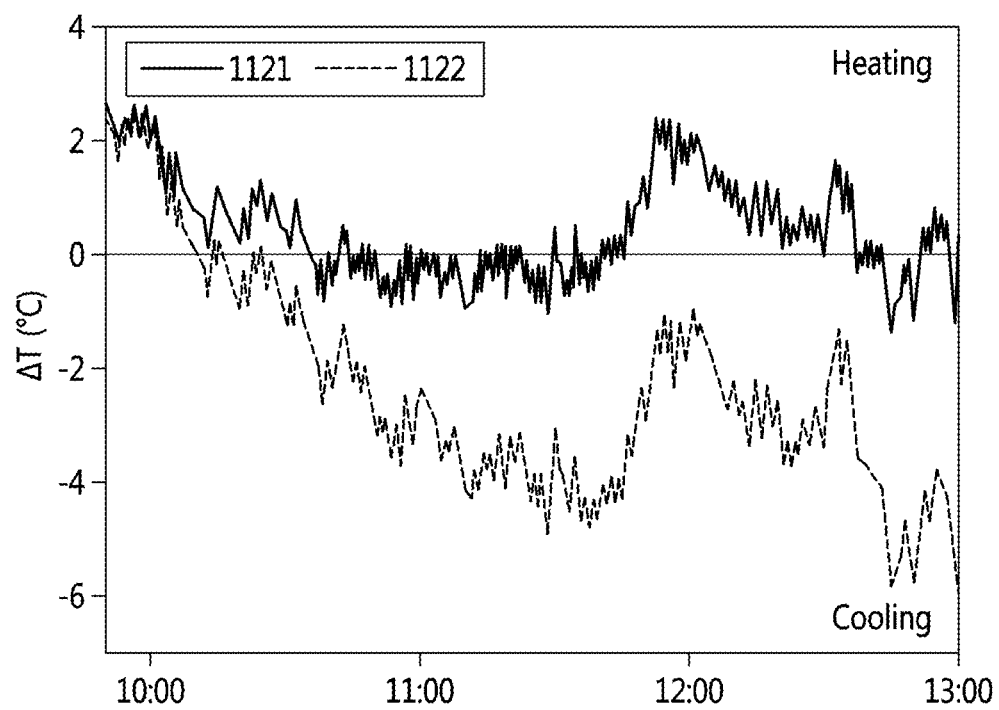

FIG. 11C illustrates a comparison of only changes in temperature between the radiative cooling paint according to an embodiment of the present invention and the conventional white paint.

Referring to a graph 1120 of FIG. 11C, a graph line 1121 representing the conventional white paint represents a heating effect, and a graph line 1122 representing the radiative cooling paint according to an embodiment of the present invention represents a cooling effect.

Figure 11D:
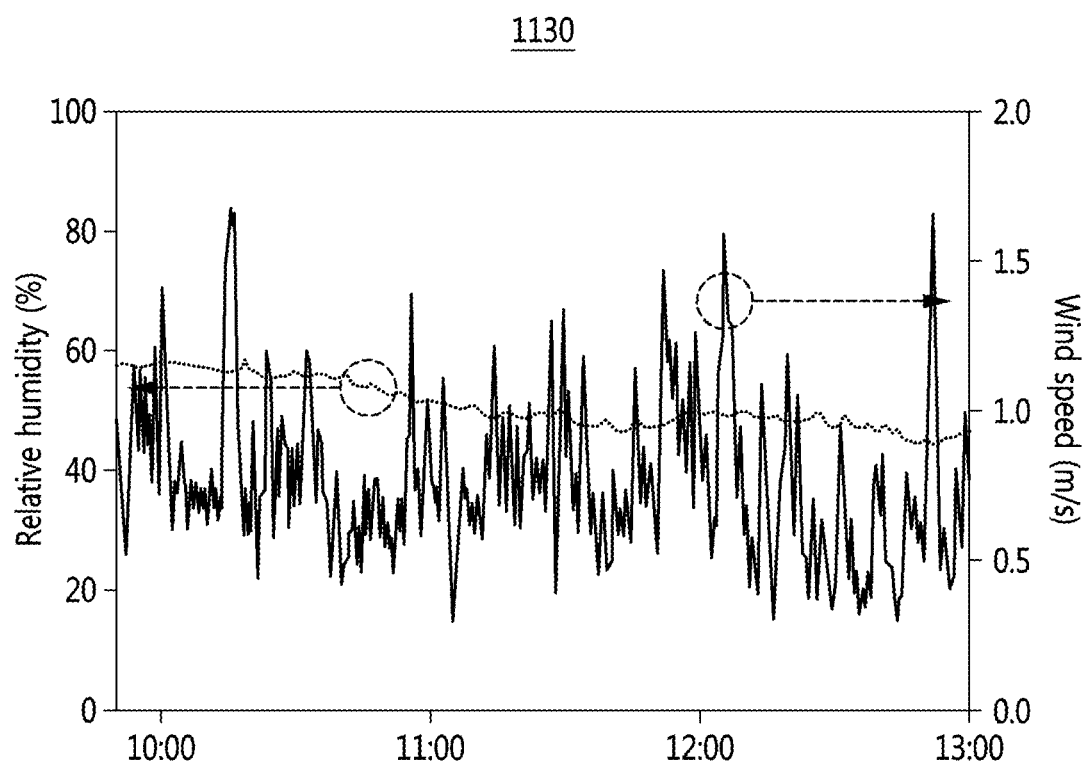

FIG. 11D illustrates humidity and wind strength in a water cooling measurement experiment of a radiative cooling device including a paint coating layer according to an embodiment of the present invention.

Figure 11E:
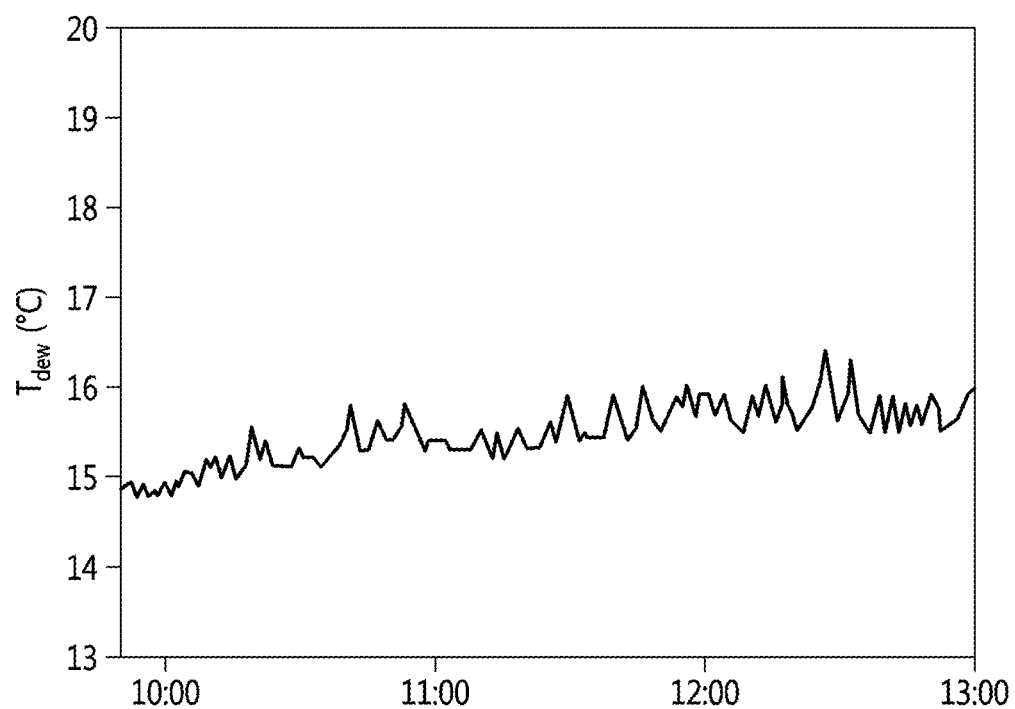

FIG. 11E illustrates changes in dew point temperature in a water cooling measurement experiment of the radiative cooling device including the paint coating layer according to an embodiment of the present invention.

Referring to a graph 1130 of FIG. 11D, the humidity has a range of 60% to 45%, and the change in wind speed is not large.

Referring to a graph 1140 of FIG. 11E, the dew point temperature decreases over time.

Figure 11F:
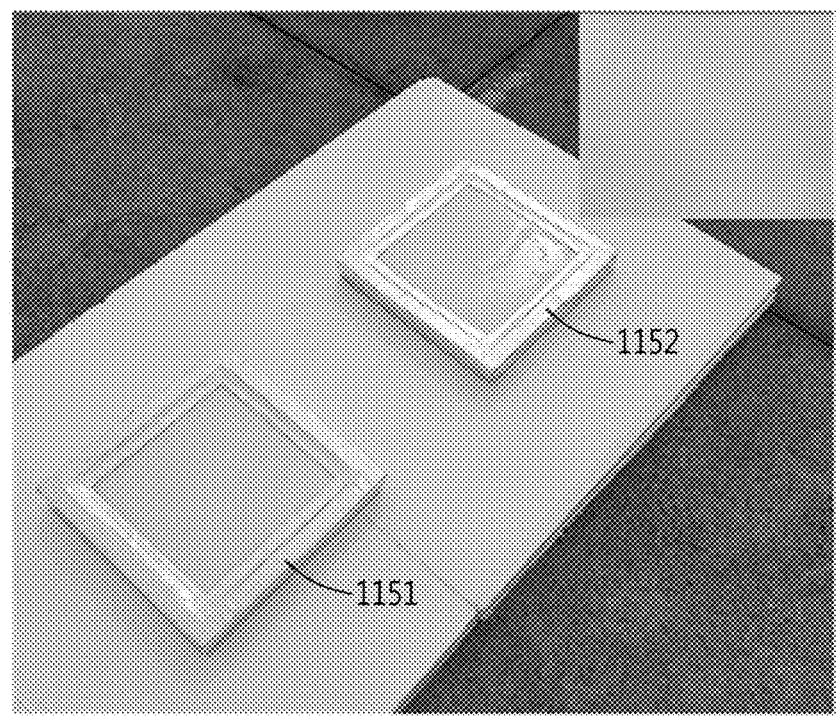

FIG. 11F illustrates a sample 1151 coated with the white paint and a sample 1152 coated with the paint according to an embodiment of the present invention in an external environment 1150 of the water cooling measurement experiment, and the upper right side illustrates a sky image in the external environment of the experiment.

Specifically, in the water cooling measurement experiment, the sample 1151 and the sample 1152 were exposed to the sky at 10:00.

With a cloudy weather and a low solar flux, the white paint according to the related art showed almost a difference in ambient temperature of 0.3° C. and −1.3° C. for the average and minimum temperature change (ΔT), respectively.

However, the radiative cooling paint according to an embodiment of the present invention was shown to be −3.4° C. and −6.2° C. for average PDRC or less, that is, the average and minimum temperature change (ΔT) even in the cloudy weather.

Figure 12A:
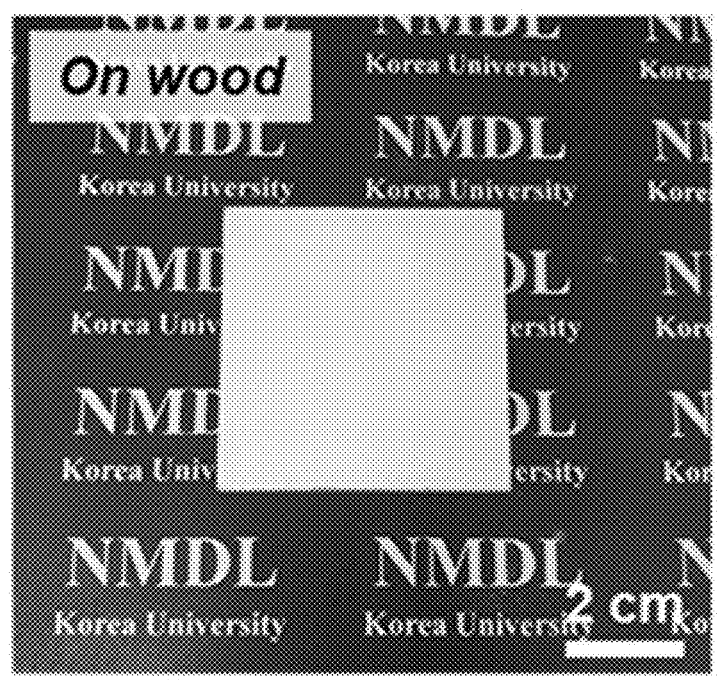
FIGS. 12A and 12B are diagrams illustrating various surfaces formed with the paint coating layer according to an embodiment of the present invention.
Figure 12B:
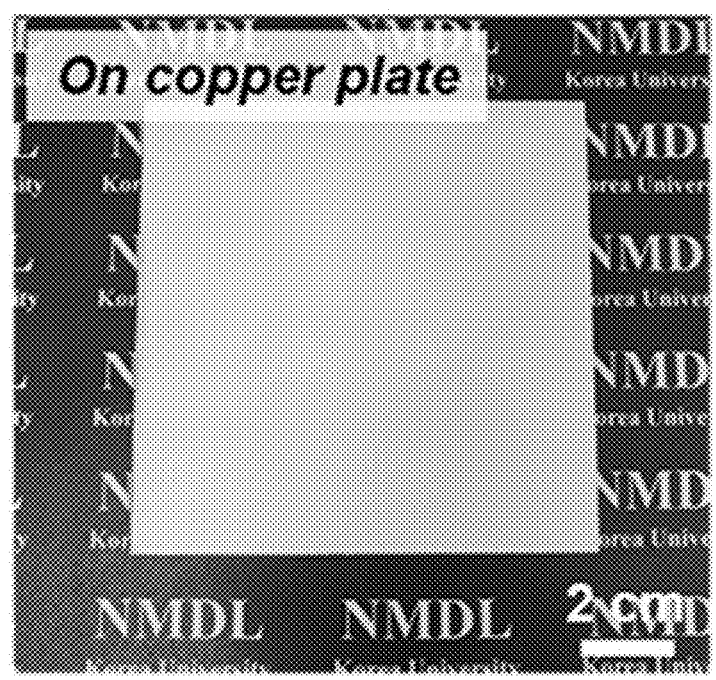

FIGS. 12A and 12B are diagrams illustrating various surfaces formed with the paint coating layer according to an embodiment of the present invention.

FIG. 12A illustrates an image in which the paint coating layer according to an embodiment of the present invention is formed on wood, and FIG. 12B illustrated an image in which the paint coating layer according to an embodiment of the present invention is formed on a copper plate.

Referring to an image 1200 of FIG. 12A and an image 1210 of FIG. 12B, the paint coating layer according to an embodiment of the present invention is well formed on the wood and the metal plate.

That is, the paint coating layer according to an embodiment of the present invention may be coated on various surfaces.

Figure 13A:
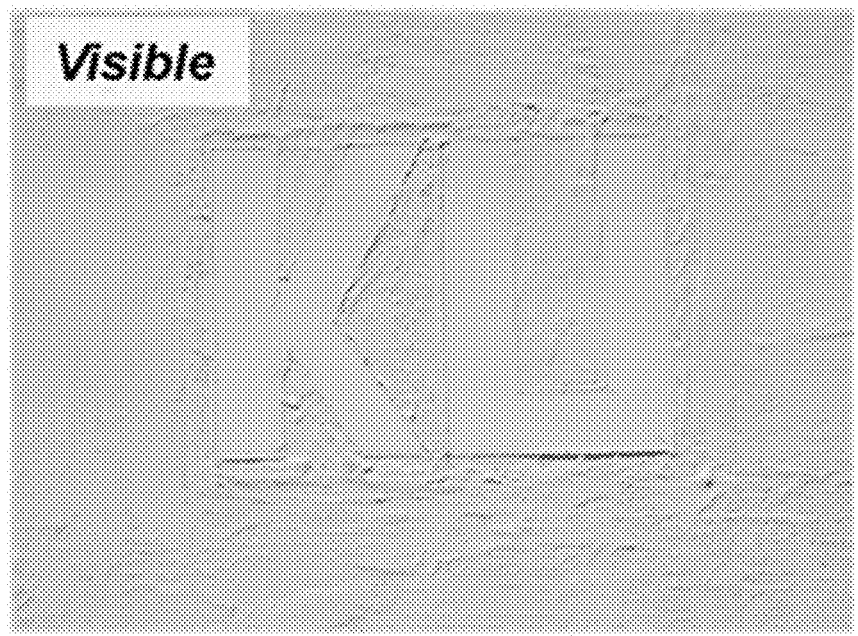
FIGS. 13A and 13B are diagrams illustrating a comparison of a visible image and an infrared image formed with the paint coating layer according to an embodiment of the present invention.
Figure 13B:
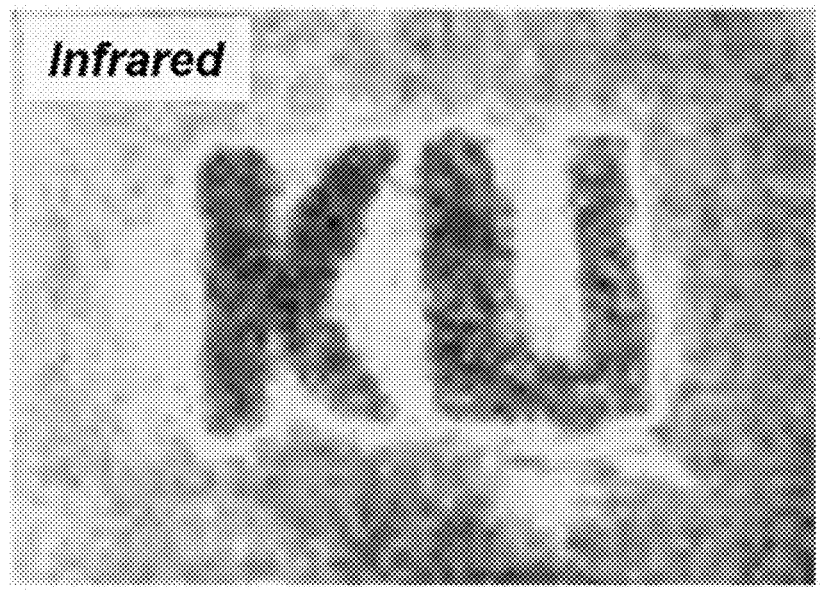

FIGS. 13A and 13B are diagrams illustrating a comparison of a visible image and an infrared image formed with the paint coating layer according to an embodiment of the present invention.

FIG. 13A illustrates a visible image of a paint coating layer formed in a predetermined pattern according to an embodiment of the present invention, and FIG. 13B illustrates an infrared image of a paint coating layer formed in a predetermined pattern according to an embodiment of the present invention.

Referring to an image 1300 of FIG. 13A and an image 1310 of FIG. 13B, KU is clearly seen on a copper plate patterned in a KU shape due to the high emissivity of the radiative cooling paint according to an embodiment of the present invention.

That is, the image 1300 is the visible image, in which the KU shape is not seen well, but the image 1310 is the infrared image, in which the KU shape portion is cooled, so that the KU shape portion is clearly seen as an infrared image through an infrared camera.

Accordingly, in the image 1310, it can be seen that the radiative cooling paint of the present invention has excellent emissivity.

Figure 14A:
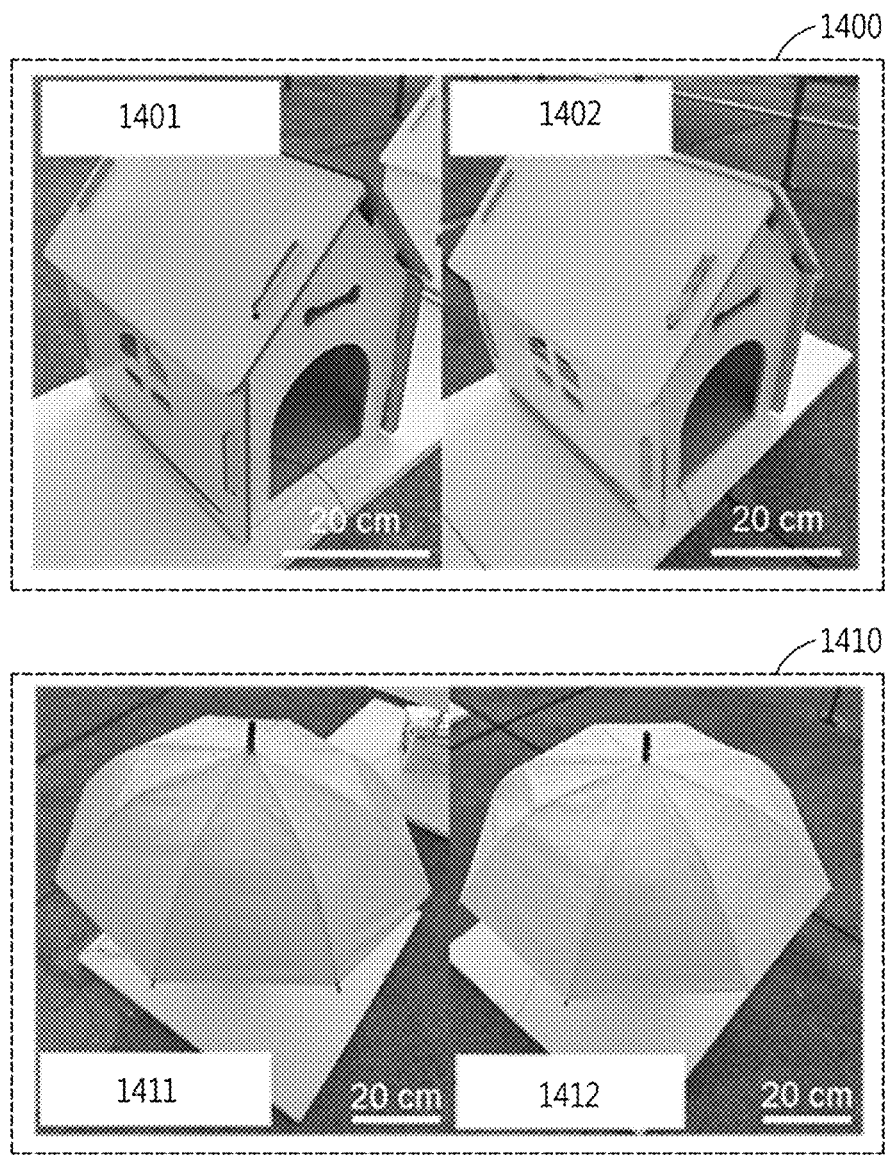
FIGS. 14A and 14B are diagrams illustrating an experiment using various surfaces which may be applied with the paint coating layer according to an embodiment of the present invention.
Figure 14B:
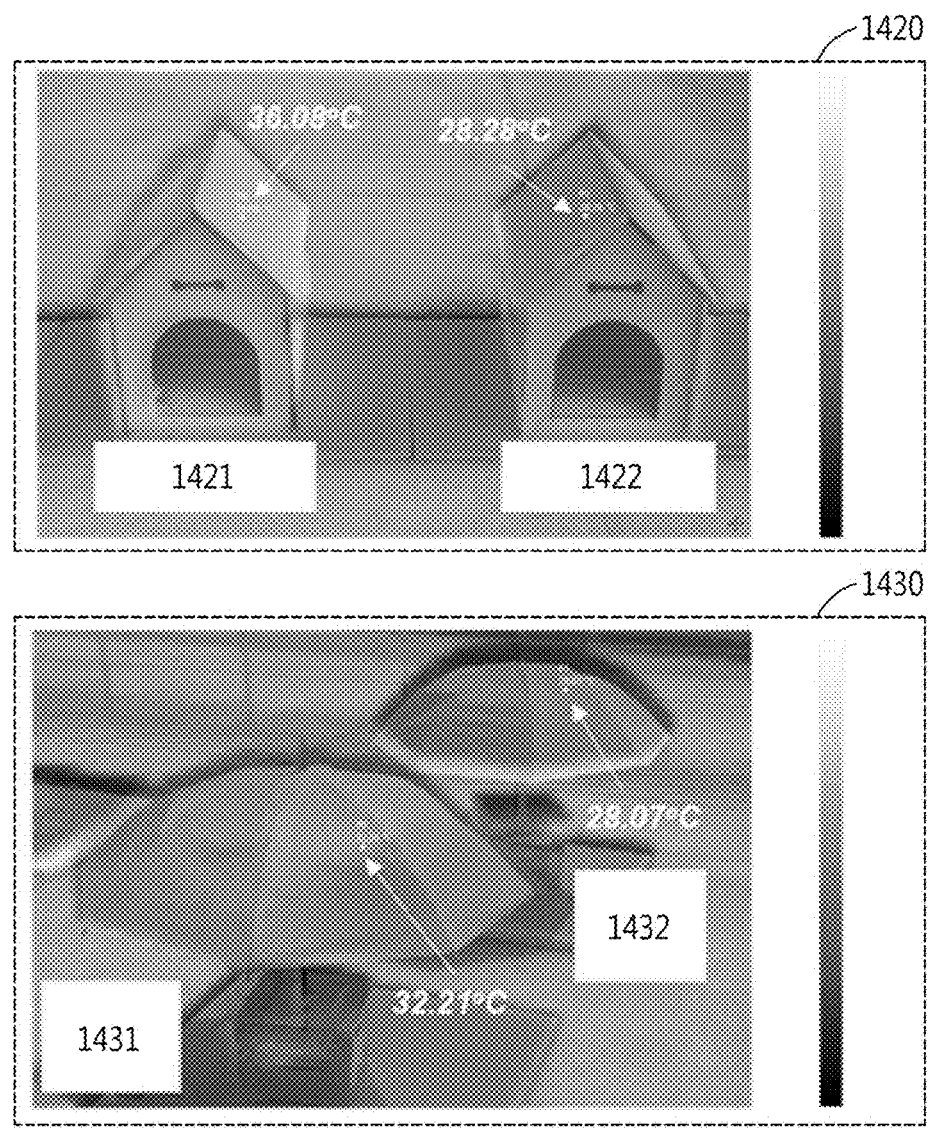

FIGS. 14A and 14B are diagrams illustrating an experiment using various surfaces which may be applied with the paint coating layer according to an embodiment of the present invention.

FIG. 14A illustrates images of a house model and an umbrella after coating or dyeing the radiative cooling paint according to an embodiment of the present invention and the white paint according to the related art on the house model or umbrella.

FIG. 14B illustrates infrared images of the house model and the umbrella after coating the radiative cooling paint according to an embodiment of the present invention and the white paint according to the related art on the house model or umbrella.

Referring to FIG. 14A, a house model image 1400 includes a house model image 1401 coated with the white paint and a house model image 1402 coated with the radiative cooling paint.

Further, an umbrella image 1410 includes an umbrella image 1411 dyed with the white paint and an umbrella image 1412 dyed with the radiative cooling paint.

Referring to the house model image 1400 and the umbrella image 1410, it can be confirmed similarly from the related image.

Referring to FIG. 14B, a house model infrared image 1420 includes a house model infrared image 1421 coated with the white paint and a house model infrared image 1422 coated with the radiative cooling paint.

Further, an umbrella infrared image 1430 includes an umbrella infrared image 1431 dyed with the white paint and an umbrella infrared image 1432 dyed with the radiative cooling paint.

Referring to the house model infrared image 1420, the temperature measured by the house model infrared image 1422 is lower than that of the house model infrared image 1421 by about 8° C.

Meanwhile, referring to the umbrella infrared image 1430, the temperature measured by the umbrella infrared image 1431 is lower than that of the umbrella infrared image 1432 by about 4° C.

That is, according to an embodiment of the present invention, the radiative cooling performance of the paint coating layer of the present invention formed by using the radiative cooling paint according to an embodiment of the present invention is better than that of the white paint according to the related art.

The average temperature change according to the experimental results may be summarized as shown in Table 1 below. Here, the average temperature change may be a value excluding a maximum temperature change from a minimum temperature change.

TABLE 1

|  | White paint (° C.) | Radiative cooling paint (° C.) |
| --- | --- | --- |
| House model | −0.6 (−0.8 to 2.2) | −1.8 (−3.2 to 0) |
| Umbrella | 2.3 (−2.8 to 8.8) | −1.6 (−4.8 to 2.25) |

Figure 15A:
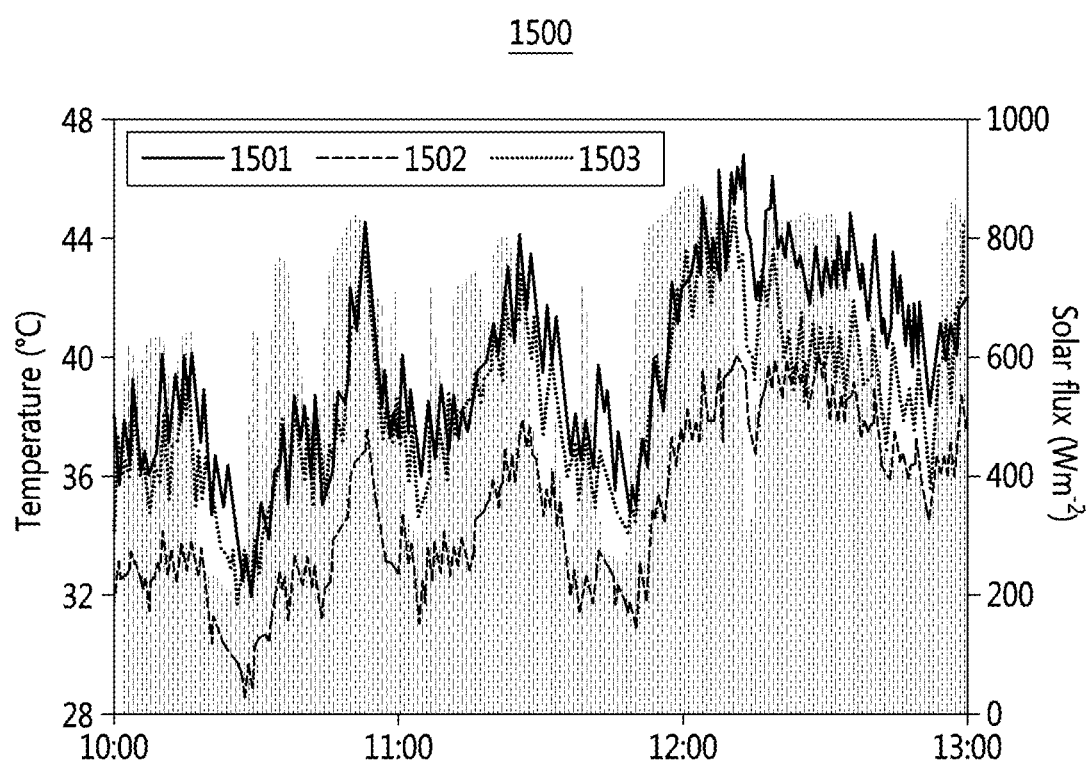
FIGS. 15A and 15B are diagrams illustrating an experiment result using various surfaces which may be applied with the paint coating layer according to an embodiment of the present invention.
Figure 15B:
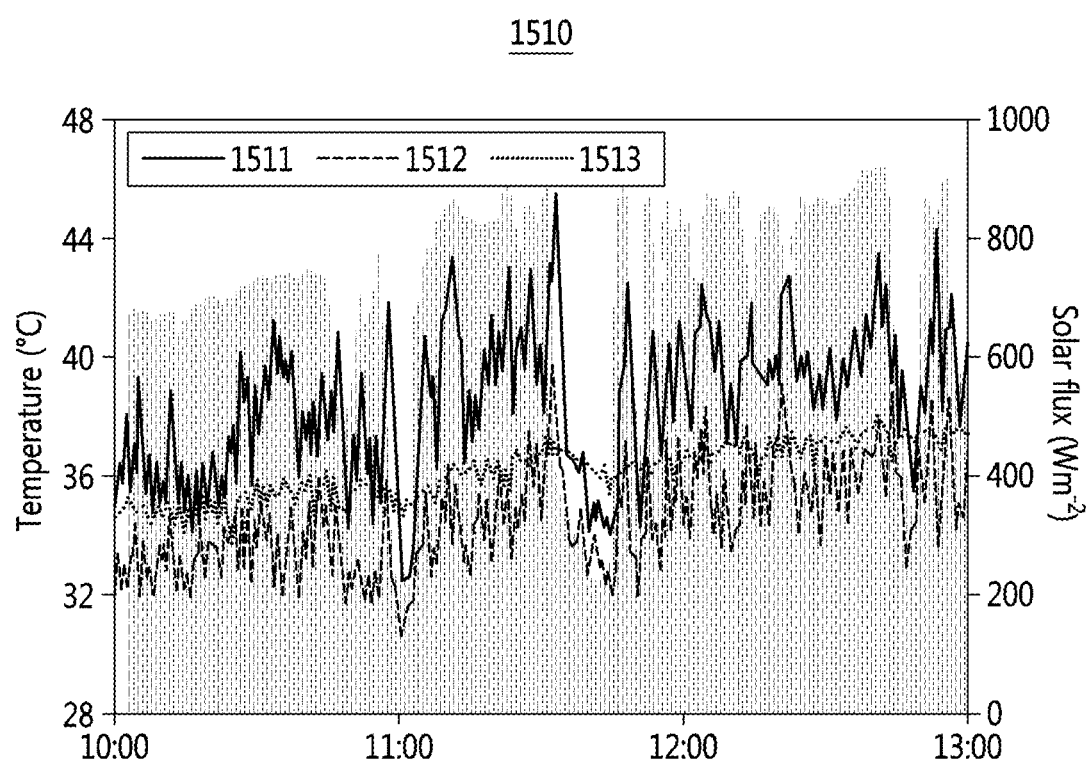

FIGS. 15A and 15B are diagrams illustrating an experiment result using various surfaces which may be applied with the paint coating layer according to an embodiment of the present invention.

FIG. 15A illustrates an experiment result using the house model described in FIG. 14B, and FIG. 15B illustrates an experiment result using the umbrella described in FIG. 14B.

Referring to a graph 1500 of FIG. 15A, a temperature change and a solar flux change are shown over time, a graph line 1501 represents the conventional white paint, a graph line 1502 represents the radiative cooling paint of the present invention, and a graph line 1503 represents the ambient air.

Referring to a graph 1510 of FIG. 15B, a temperature change and a solar flux change are shown over time, a graph line 1511 represents the conventional white paint, a graph line 1512 represents the radiative cooling paint of the present invention, and a graph line 1513 represents the ambient air.

According to the graph 1500 of FIG. 15A and the graph 1510 of FIG. 15B, the radiative cooling paint of the present invention exhibits a cooling effect based on the temperature of the ambient air according to an embodiment of the present invention, whereas the temperature of the white paint of the related art increases.

That is, the radiative cooling paint according to an embodiment of the present invention has excellent radiative cooling performance compared to the white paint of the related art.

Therefore, the present invention may provide a cooling function without energy consumption by being applied to an outer surface of a material requiring cooling, such as construction materials, glass, automotive materials, aviation equipment, energy-saving data centers, electronic devices, solar cells, etc.

Further, the present invention may prevent skin burns by sunlight during the day time by being applied to wearable devices, clothes, shoes, umbrellas, etc.

Further, the present invention may provide a stable radiative cooling function even when being exposed to an external environment for a long time by applying a plate made of a ceramic material with excellent chemical stability and mechanical property.

Figure 16A:
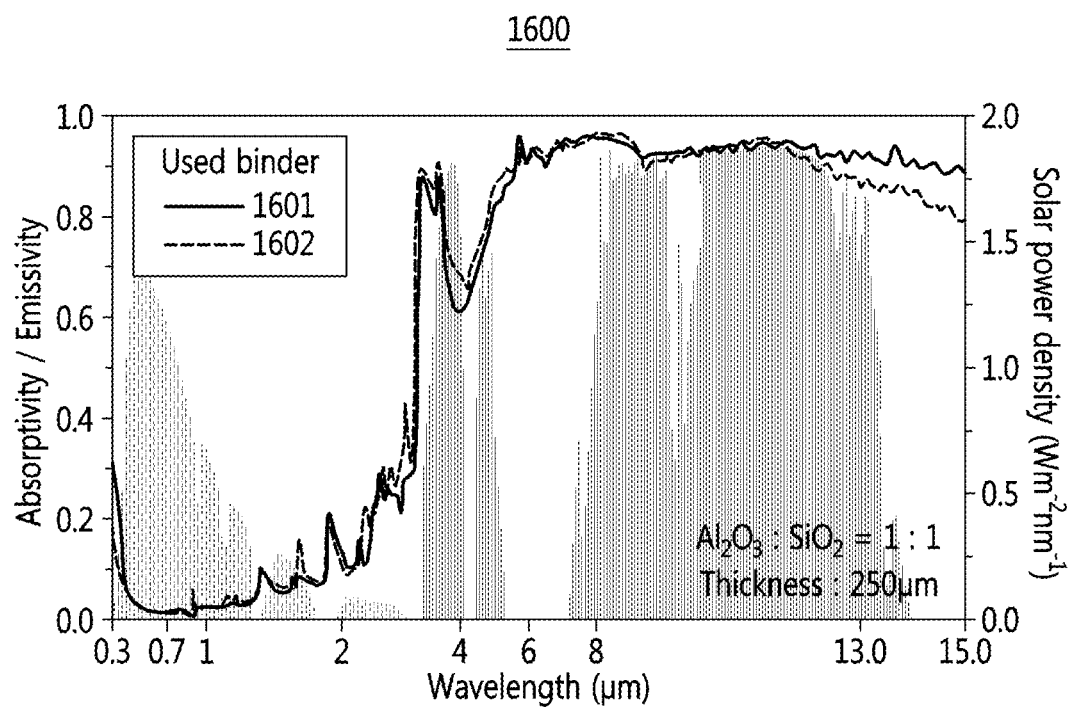
FIGS. 16A to 16E are diagrams illustrating optical properties and cooling properties according to a type of binder to be used for forming the paint coating layer according to an embodiment of the present invention.

FIGS. 16A to 6E are diagrams illustrating optical properties and cooling properties according to a type of binder to be used for forming the paint coating layer according to an embodiment of the present invention.

Figure 16B:
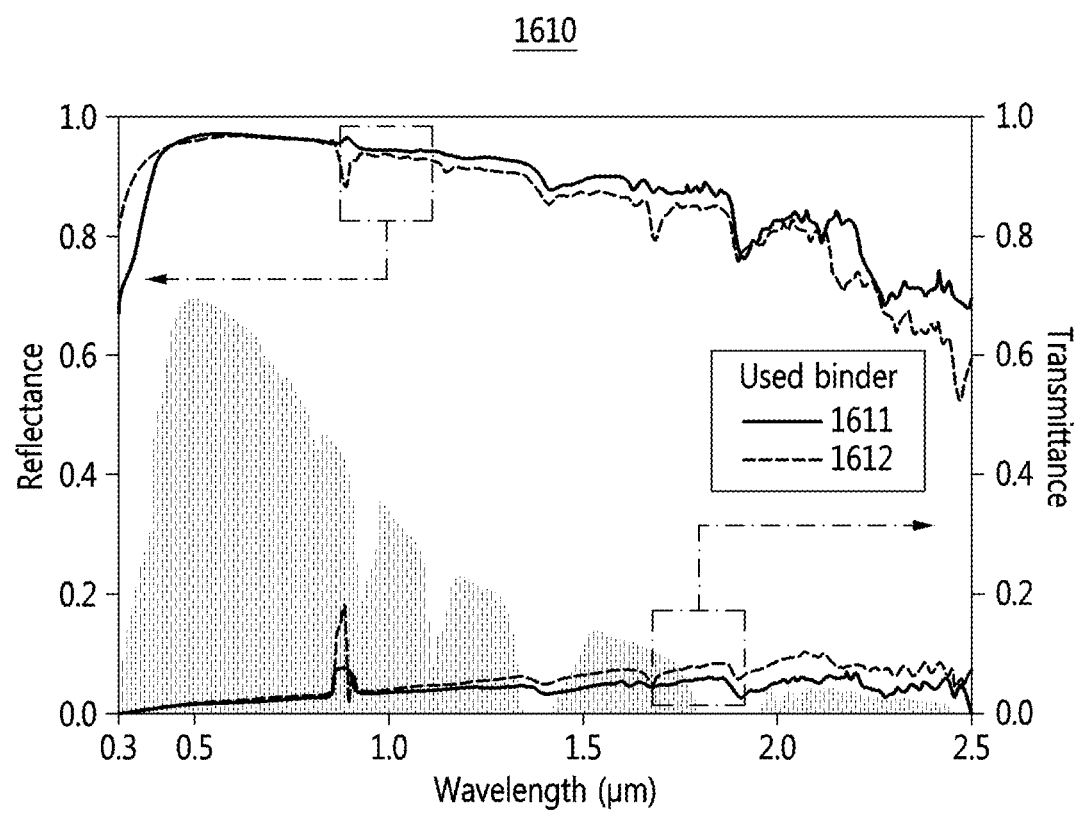
Figure 16C:
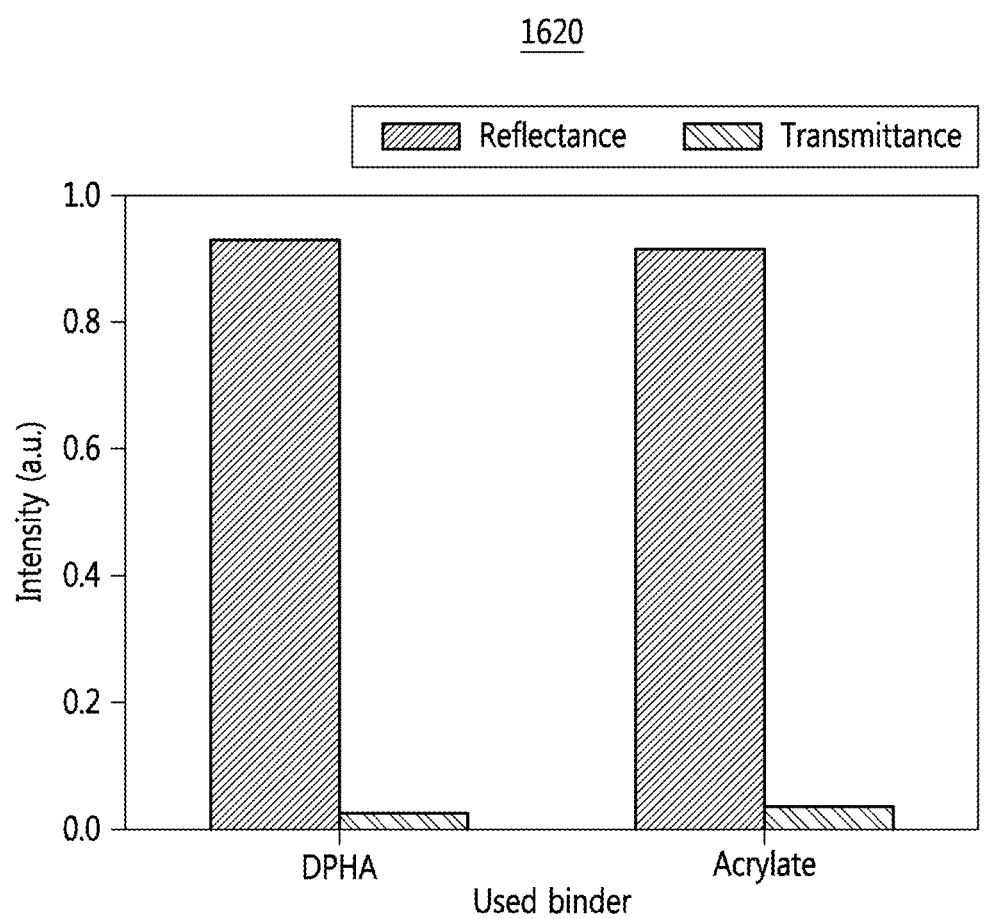

FIGS. 16A to 16C show optical properties of a binder used to form a paint coating layer according to an embodiment of the present invention.

Figure 16D:
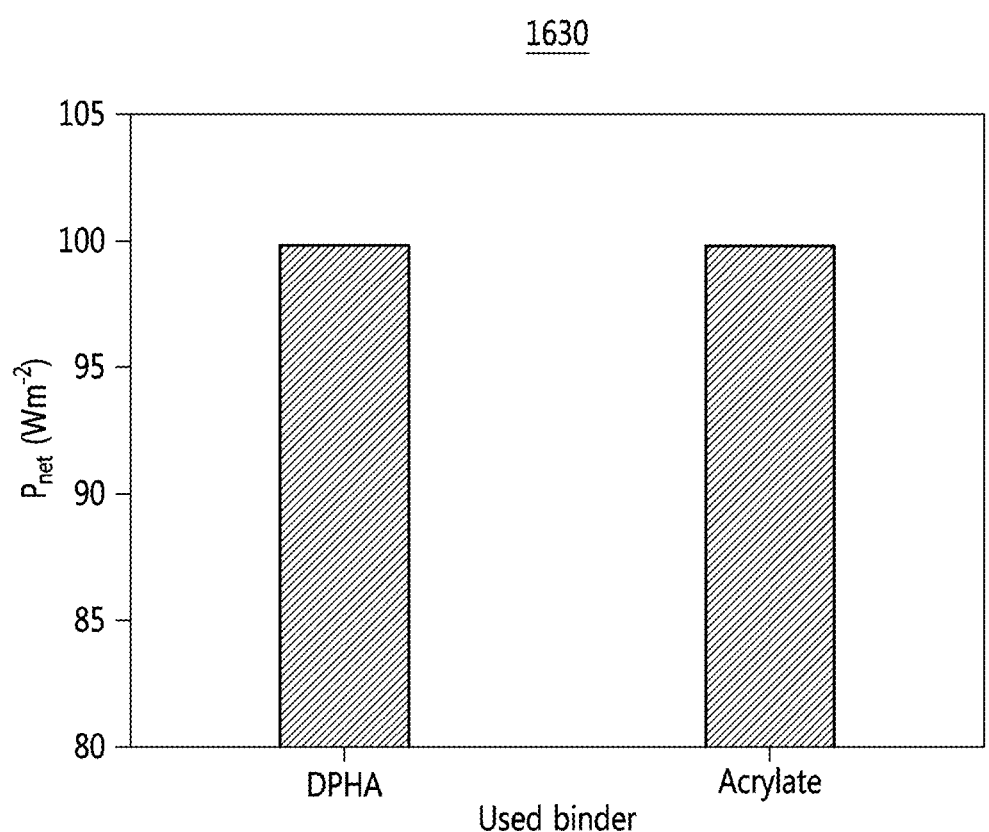

Meanwhile, FIG. 16D shows cooling properties according to the binder used to form the paint coating layer according to an embodiment of the present invention.

Figure 16E:
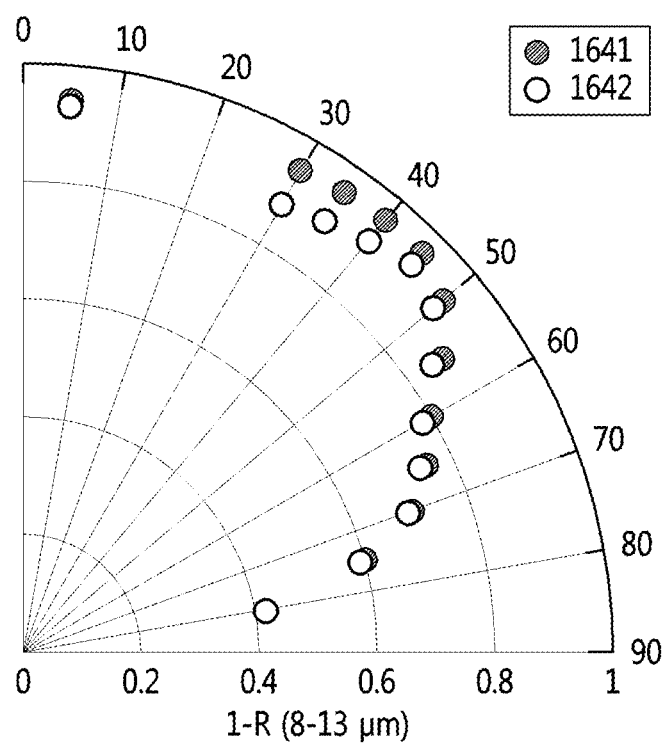

Next, FIG. 16E shows emissivity for each incident angle of sunlight of the binder used to form the paint coating layer according to an embodiment of the present invention. Here, the incident angle may be associated with infrared rays in the sunlight.

In FIGS. 16A to 16E, the paint coating layer according to an embodiment of the present invention has a difference in the type of binder, and a volumetric ratio of nano or microparticles corresponds to a ratio of $Al_2O_3$ and $SiO_2$ of 1:1, and a thickness thereof is 250 μm.

Referring to a graph 1600 of FIG. 16A, changes in absorptivity/emissivity for each wavelength are illustrated according to a type of the binder used to form the paint coating layer according to an embodiment of the present invention.

A graph line 1601 of the graph 1600 illustrates DPHA among the types of binders, and a graph line 1602 illustrates acrylate among the types of binders.

The graph line 1601 and the graph line 1602 indicate that the binder has absorptivity/emissivity in a wavelength range of the sky window.

Referring to a graph 1610 of FIG. 16B, changes in reflectance for each wavelength are illustrated according to a type of the binder used to form the paint coating layer according to an embodiment of the present invention.

A graph line 1611 of the graph 1610 illustrates DPHA among the types of binders, and a graph line 1612 illustrates acrylate among the types of binders.

The graph line 1611 and the graph line 1612 indicate that the binder has reflectance in the wavelength range of incident sunlight, and according to the graph 1610, the reflectance of DPHA is relatively excellent.

Referring to a graph 1620 of FIG. 16C, changes in reflectance and transmittance are illustrated according to a type of the binder used to form the paint coating layer according to an embodiment of the present invention.

The graph 1620 exemplifies DPHA among the types of binders, and exemplifies acrylate among the types of binders.

According to the graph 1620, the binder has excellent reflectance and low transmittance.

Referring to a graph 1630 of FIG. 16D, cooling power is illustrated according to a type of the binder used to form the paint coating layer according to an embodiment of the present invention.

The graph 1630 shows that the binder has cooling power of about 100 W/m$^2$.

Referring to a graph 1640 of FIG. 16E, among the types of binders, DPHA corresponds to an indicating point 1641, and among the types of binders, acrylate corresponds to an indicating point 1642.

The indicating point 1641 and the indicating point 1642 indicate that the binder has emissivity according to an incident angle in a wavelength range of the sky window. Here, the incident angle may be an incident angle of infrared rays.

Accordingly, the binder for forming the paint coating layer included in the radiative cooling device according to an embodiment of the present invention may also provide an effect of improving the radiative cooling performance by supporting the infrared emissivity in the wavelength range of the sky window.

Figure 17:
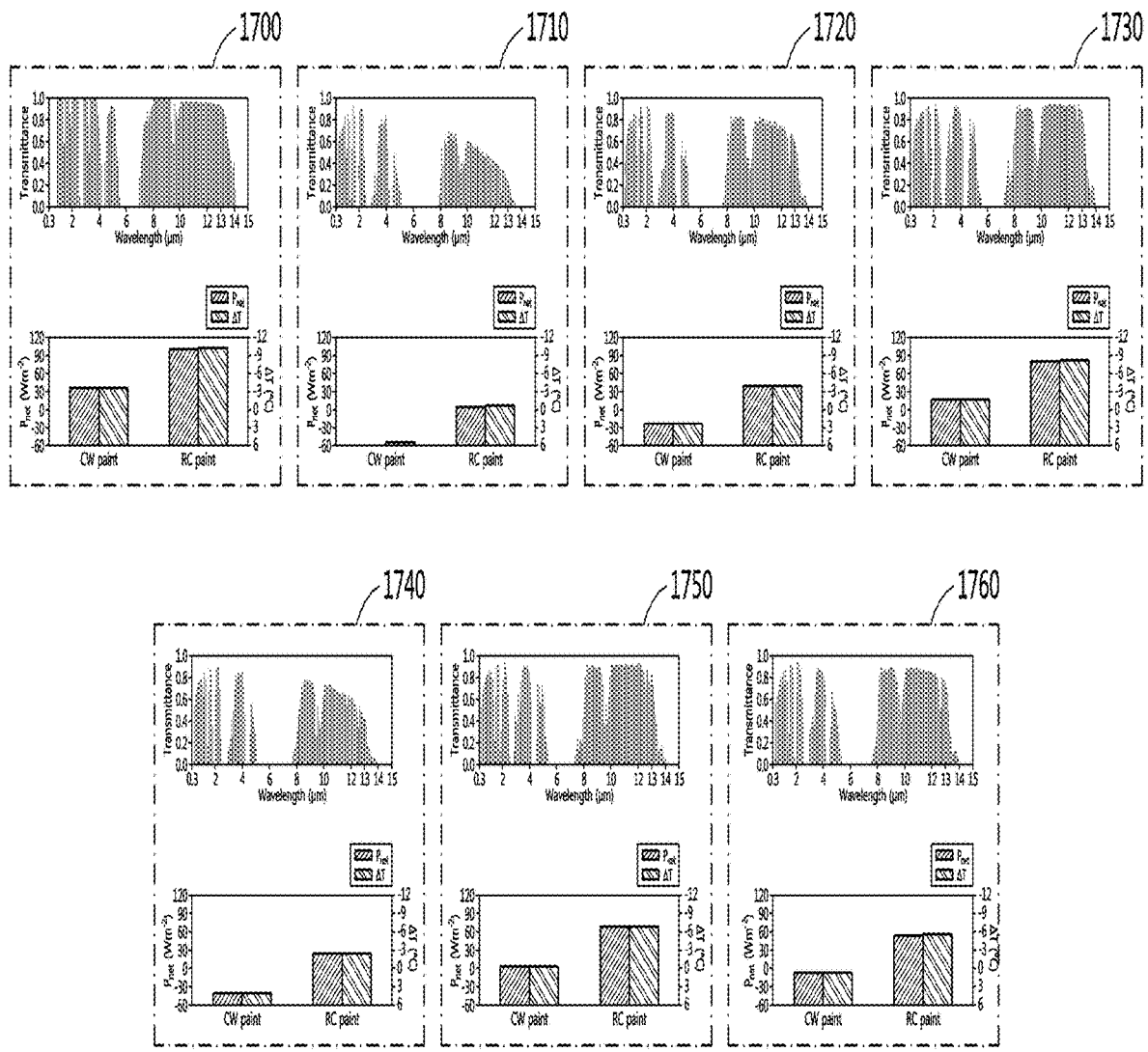
FIG. 17 is a diagram illustrating net cooling power and cooling temperature of the paint coating layer according to an embodiment of the present invention.

FIG. 17 is a diagram illustrating net cooling power and cooling temperature of the paint coating layer according to the embodiment of the present invention.

FIG. 17 illustrates measurement results for net cooling power and cooling temperature calculated according to seven atmospheric transmittance models with respect to the paint coating layer according to an embodiment of the present invention.

Referring to FIG. 17, a graph 1700 shows the transmittance and net cooling power for each wavelength at an air pressure of 1.5, a graph 1710 shows the transmittance and net cooling power for each wavelength at a tropical night, and a graph 1720 shows the transmittance and net cooling power for each wavelength in the sub-arctic summer. In addition, a graph 1730 shows the transmittance and net cooling power for each wavelength in the sub-arctic winter, a graph 1740 shows the transmittance and net cooling power for each wavelength in the mid-latitude summer, a graph 1750 shows the transmittance and net cooling power for each wavelength in the mid-latitude winter, and a graph 1760 shows the transmittance and net cooling power for each wavelength in the US standard in 1976.

The graphs 1700 to 1760 show that there is a difference in transmittance and net cooling power for each wavelength according to a location and a season.

In the graphs 1700 to 1760, in the graphs showing the transmittance, a horizontal axis represents the wavelength and a vertical axis represents the transmittance, and in the graphs showing the net cooling power and cooling temperature, a horizontal axis represents a type of paint and a vertical axis represents the net cooling power.

In the graphs 1700 to 1760, the net cooling power is similar to the cooling temperature, and the radiative cooling paint according to an embodiment of the present invention has excellent cooling performance compared to the white paint according to the related art regardless of the location and season.

Figure 18:
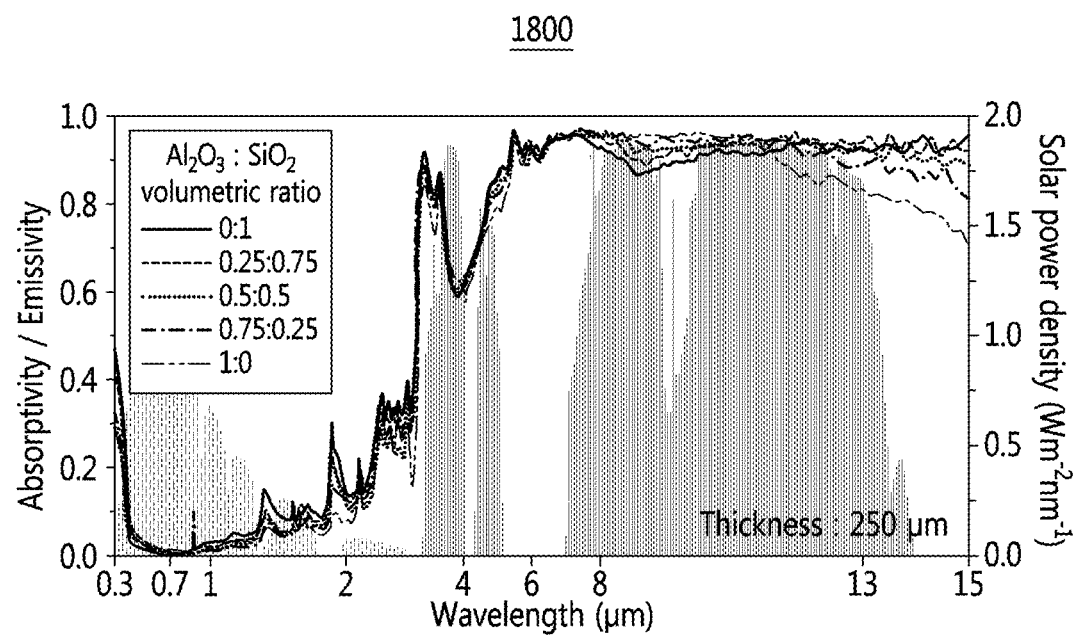
FIG. 18 is a diagram illustrating optical properties according to a volumetric ratio of nano or microparticles forming the paint coating layer according to an embodiment of the present invention.

FIG. 18 is a diagram illustrating optical properties according to a volumetric ratio of nano or microparticles forming the paint coating layer according to the embodiment of the present invention.

FIG. 18 illustrates a change in optical properties according to a change in the volumetric ratio of $Al_2O_3$ and $SiO_2$ when the thickness of the paint coating layer according to an embodiment of the present invention is 250 μm, and illustrates relatively various volumetric ratios compared to FIG. 4A.

Referring to a graph 1800 of FIG. 18B, when the ratios of $Al_2O_3$ and $SiO_2$ in the nano or microparticles forming the paint coating layer according to an embodiment of the present invention are 0.25:0.75, 0.5:0.5, 0.75:0.25 and 1:0, changes in absorptivity/emissivity for each wavelength are illustrated.

Optical properties according to the ratios of $Al_2O_3$ and $SiO_2$ of 0:1, 0.25:0.75, 0.5:0.5, 0.75:0.25, and 1:0 may be summarized in Table 2 below. For example, in the ratios of $Al_2O_3$ and $SiO_2$, 0.25:0.75 may be 1:3, 0.5:0.5 may be 1:1, and 0.75:0.25 may be 3:1.

TABLE 2

| $Al_2O_3$:$SiO_2$ | 0:1 | 0.25:0.75 | 0.5:0.5 | 0.75:0.25 | 1:0 |
| --- | --- | --- | --- | --- | --- |
| Average transmittance (%) | 7.38 | 4.09 | 2.73 | 2.21 | 1.96 |
| Average reflectance (%) | 88.75 | 92.1 | 94.1 | 94.3 | 94.6 |
| Average absorptivity (%) | 3.87 | 3.81 | 3.2 | 3.49 | 3.44 |
| Sky window emissivity (%) | 91.2 | 93.2 | 93.5 | 93.6 | 92.4 |
| Total cooling power (Wm$^{-2}$) | 91.68 | 95.01 | 100.31 | 100.58 | 95.79 |

Referring to Table 2, the average transmittance may represent average solar transmittance, the average reflectance may represent average solar reflectance, the average absorptivity may represent average solar absorptivity, and the sky window emissivity may represent infrared emissivity in a wavelength range corresponding to the sky window.

According to Table 2, when the ratios of $Al_2O_3$:$SiO_2$ are 0.5:0.5 and 0.75:0.25, the sky window emissivity and the total cooling power are relatively excellent compared to other ratios.

Therefore, it may be preferred that the paint coating layer according to an embodiment of the present invention is formed by coating or dyeing, on various surfaces, a paint solution in which nano or microparticle powders are mixed in any one volumetric ratio of 3:1 and 1:1.

FIGS. 19A to 19D are diagrams illustrating optical properties and cooling power according to a ratio of the binder and the nano or microparticles forming the paint coating layer according to an embodiment of the present invention.

FIGS. 19A to 19D illustrate optical properties according to a ratio of the nano or microparticles and the binder in a paint solution for forming the paint coating layer according to an embodiment of the present invention. Here, the nano or microparticles may have a ratio of $Al_2O_3$:$SiO_2$ of 1:1, and the thickness of the paint coating layer may be 250 μm.

Figure 19A:
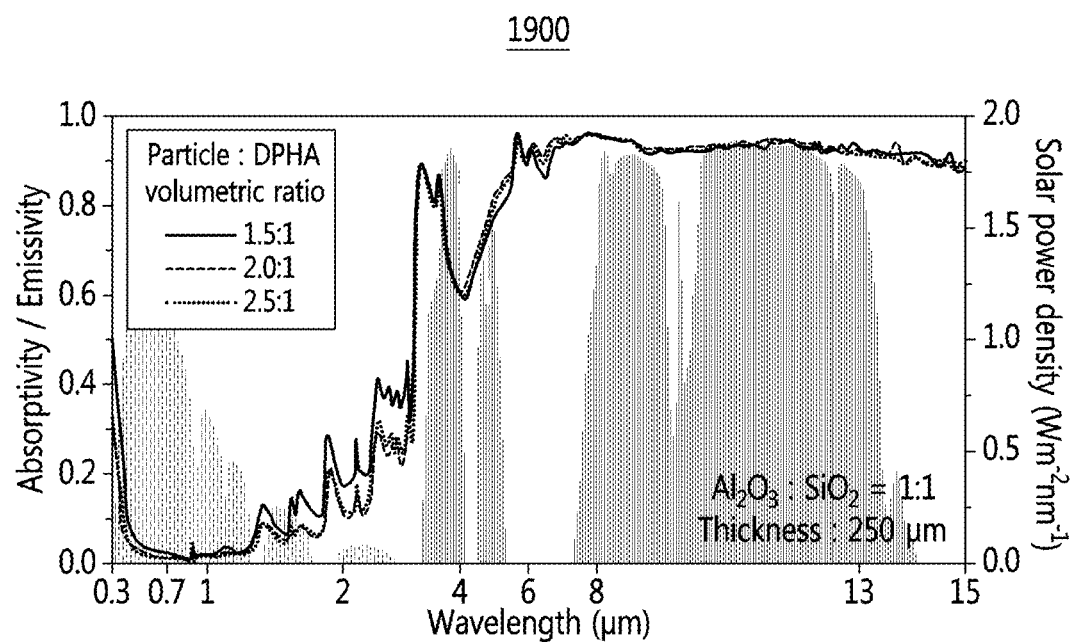
FIGS. 19A to 19D are diagrams illustrating optical properties and cooling power according to a ratio of the binder and the nano or microparticles forming the paint coating layer according to an embodiment of the present invention.

FIG. 19A illustrates changes in absorptivity/emissivity for each wavelength when the ratios of the nano or microparticles and the binder are 1.5:1, 2:1, and 2.5:1 in the paint solution for forming the paint coating layer according to an embodiment of the present invention. Referring to a graph 1900 of FIG. 19A, a graph 1900 shows changes in absorptivity/emissivity for each wavelength when the ratios of the nano or microparticles and the binder are 1.5:1, 2:1, and 2.5:1, respectively.

According to an embodiment of the present invention, the ratio of the nano or microparticles to the binder is x:1, wherein x may have a range of 0.2 to 2.5.

Figure 19B:
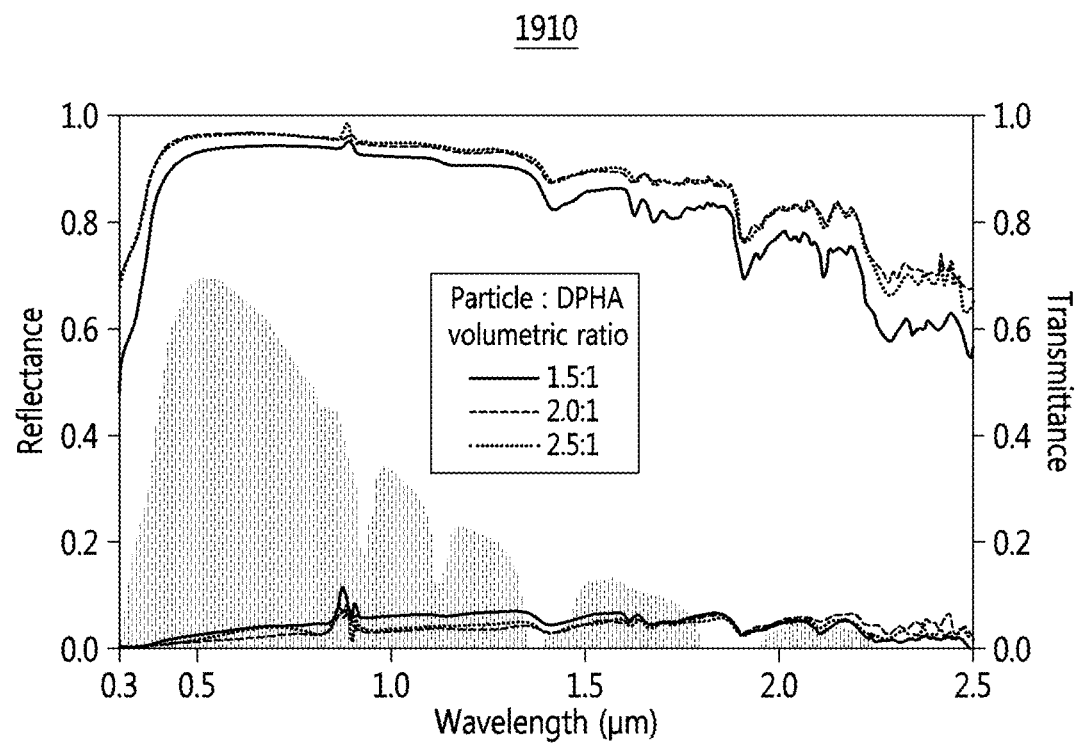

FIG. 19B illustrates changes in reflectance for each wavelength when the ratios of the nano or microparticles and the binder are 1.5:1, 2:1, and 2.5:1 in the paint solution for forming the paint coating layer according to an embodiment of the present invention.

Referring to a graph 1910 of FIG. 19B, when the ratios of the nano or microparticles and the binder are 1.5:1, 2:1, and 2.5:1, there is a difference in reflectance, and as the ratio of the nano or microparticles increases, the reflectance is increased.

Figure 19C:
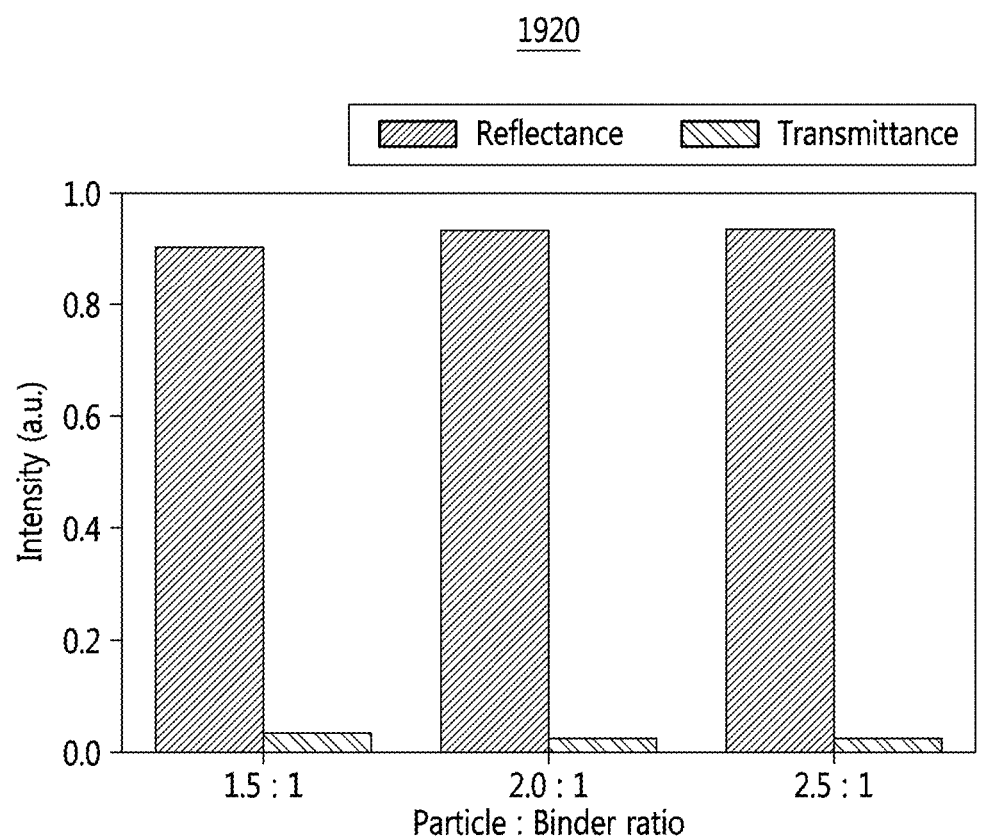

FIG. 19C illustrates reflectance and transmittance when the ratios of the nano or microparticles and the binder are 1.5:1, 2:1, and 2.5:1 in the paint solution for forming the paint coating layer according to an embodiment of the present invention.

Referring to a graph 1920 of FIG. 19C, in the case of the ratios of 1.5:1, 2:1 and 2.5:1, there are differences in reflectance and transmittance, and as the ratio of nano or microparticles increases, the reflectance increases and the transmittance decreases.

Figure 19D:
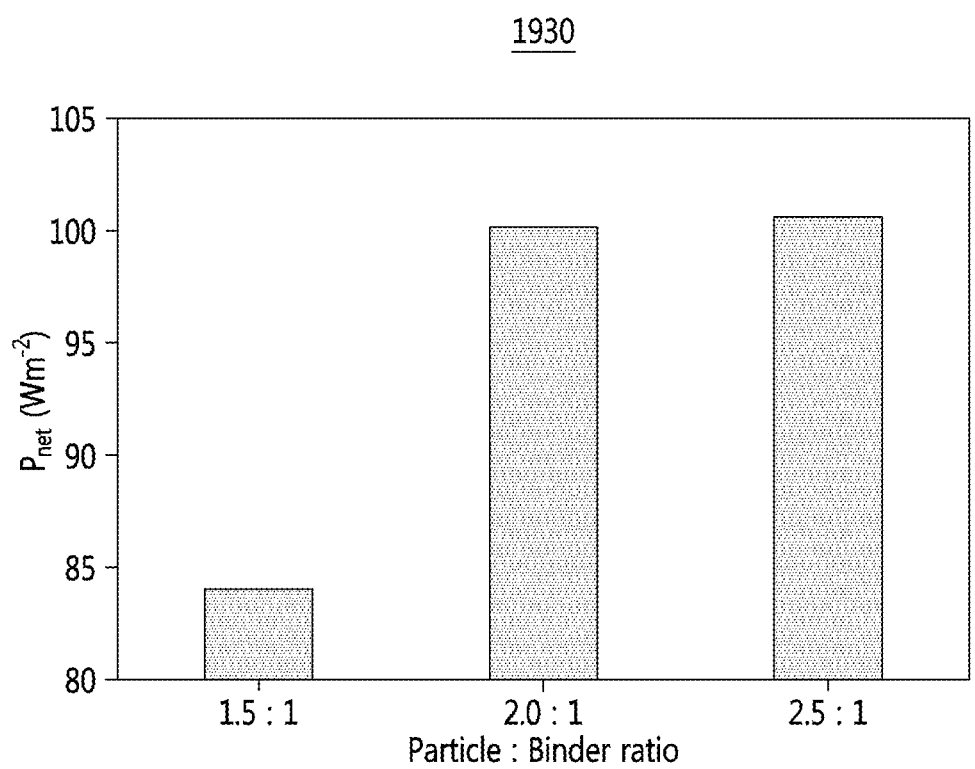

FIG. 19D illustrates cooling power when the ratios of the nano or microparticles and the binder are 1.5:1, 2:1, and 2.5:1 in the paint solution for forming the paint coating layer according to an embodiment of the present invention.

Referring to a graph 1930 of FIG. 19D, in the case of the ratios of 1.5:1, 2:1 and 2.5:1, there are differences in cooling power, and as the ratio of nano or microparticles increases, the cooling power increases.

In the specific embodiments described above, the components included in the present invention are expressed in singular or in plural in accordance with the specific embodiment described.

However, it is to be understood that the singular or plural expression is selected suitably for the situation for convenience of description, and the embodiments described above are not limited to the singular or plural components, and components expressed in plural may be constituted in singular or components expressed in singular may be constituted in plural.

Meanwhile, although specific embodiments have been described in the description of the present invention, various modifications can be made without departing from the scope of the technical idea included in the various embodiments.

Therefore, the scope of the present invention should not be limited and defined to the embodiments and should be defined by not only the appended claims but also equivalents to the appended claims.

What is claimed is:

1. A radiative cooling device comprising:
a paint coating layer comprising
nano or microparticles of which a particle size and a composition are determined in consideration of infrared emissivity and reflectance to incident sunlight in a wavelength range corresponding to a sky window; and
a binder mechanically connecting surfaces of the nano or microparticles in a solvent,
wherein the nano or microparticles comprise at least one material selected from the group consisting of $SiO_2$, $Al_2O_3$, $CaCO_3$, $CaSO_4$, c-BN, $ZrO_2$, $MgHPO_4$, $Ta_2O_5$, AlN, LiF, $MgF_2$, $HfO_2$, and $BaSO_4$.

2. The radiative cooling device of claim 1, wherein the nano or microparticles comprise at least two materials selected from the group consisting of $SiO_2$, $Al_2O_3$, $CaCO_3$, $CaSO_4$, c-BN, $ZrO_2$, $MgHPO_4$, $Ta_2O_5$, AlN, LiF, $Mg F_2$, $HfO_2$, and $BaSO_4$.

3. The radiative cooling device of claim 2, wherein the nano or microparticles comprise a core and a shell, wherein a first material comprised in the core and a second material comprised in the shell are different from each other, and the infrared emissivity and reflectance of the first material and the infrared emissivity and reflectance of the second material are determined so as to be complemented with each other for infrared emissivity and reflectance to incident sunlight in the wavelength range corresponding to the sky window.

4. The radiative cooling device of claim 3, wherein in the paint coating layer, the thickness of the shell is adjusted to control at least one property of a reflective property, an absorption property, and a transmission property according to a difference in refractive index between the wavelength range corresponding to the sky window and the wavelength range of incident sunlight.

5. The radiative cooling device of claim 2, wherein in the paint coating layer, the infrared emissivity and the reflectance are determined by overlapping infrared emissivity and reflectance of each of the nano or microparticles.

6. The radiative cooling device of claim 2, wherein the paint coating layer is formed by coating or dyeing, on various surfaces, a paint solution in which powers of the nano or microparticles are mixed in any one volumetric ratio of 1:0, 3:1, 1:1, 1:3, and 0:1.

7. The radiative cooling device of claim 1, wherein the binder comprises at least one binder material selected from the group consisting of dipentaerythritol hexaacrylate (DPHA), polytetrafluoroethylene (DPHA), poly urethane acrylate (PUA), ethylene tetra fluoro ethylene (ETFE), polyvinylidene fluoride (PVDF), acrylic polymers, polyester polymers, and polyurethane polymers.

8. The radiative cooling device of claim 7, wherein in the paint coating layer, the infrared emissivity is increased based on infrared emissivity in a wavelength range corresponding to the sky window of the at least one binder material.

9. The radiative cooling device of claim 7, wherein the paint coating layer is formed by coating or dyeing, on various surfaces, a paint solution in which the nano or microparticles and the binder are mixed in a volumetric ratio of x:1,
wherein the x has a range of 0.2 to 2.5.

10. The radiative cooling device of claim 1, further comprising:
a polymeric protective layer for blocking penetration of foreign substances on the paint coating layer.

11. The radiative cooling device of claim 1, wherein a thickness of the paint coating layer is 30 μm to 600 μm.

12. The radiative cooling device of claim 11, wherein as the thickness of the paint coating layer increases, the reflectance increases and the transmittance decreases.

13. The radiative cooling device of claim 1, wherein the paint coating layer has infrared emissivity of 0.6 or more when the infrared rays are incident at an incident angle of 40° to 70° with respect to a reference line perpendicular to the infrared rays.

14. A radiative cooling device comprising:
a paint coating layer comprising
nano or microparticles of which a particle size and a composition are determined in consideration of infrared emissivity and reflectance to incident sunlight in a wavelength range corresponding to a sky window; and
a binder mechanically connecting surfaces of the nano or microparticles in a solvent,
wherein the nano or microparticles comprise a core and a shell, wherein a first material comprised in the core and a second material comprised in the shell are different from each other, and the infrared emissivity and reflectance of the first material and the infrared emissivity and reflectance of the second material are determined so as to be complemented with each other for infrared emissivity and reflectance to incident sunlight in the wavelength range corresponding to the sky window.

15. The radiative cooling device of claim 14, wherein the nano or microparticles comprise at least two materials selected from the group consisting of $SiO_2$, $Al_2O_3$, $CaCO_3$, $CaSO_4$, c-BN, $ZrO_2$, $MgHPO_4$, $Ta_2O_5$, AlN, LiF, $MgF_2$, $HfO_2$, and $BaSO_4$.

16. The radiative cooling device of claim 14, wherein the binder comprises at least one binder material selected from the group consisting of dipentaerythritol hexaacrylate (DPHA), polytetrafluoroethylene (DPHA), poly urethane acrylate (PUA), ethylene tetra fluoro ethylene (ETFE), polyvinylidene fluoride (PVDF), acrylic polymers, polyester polymers, and polyurethane polymers.

17. The radiative cooling device of claim 14, further comprising:
a polymeric protective layer for blocking penetration of foreign substances on the paint coating layer.

18. The radiative cooling device of claim 14, wherein a thickness of the paint coating layer is 30 μm to 600 μm.

19. The radiative cooling device of claim 18, wherein as the thickness of the paint coating layer increases, the reflectance increases and the transmittance decreases.

20. The radiative cooling device of claim 14, wherein the paint coating layer has infrared emissivity of 0.6 or more when the infrared rays are incident at an incident angle of 40° to 70° with respect to a reference line perpendicular to the infrared rays.

* * * * *